(12) United States Patent
Lim et al.

(10) Patent No.: US 12,132,988 B2
(45) Date of Patent: Oct. 29, 2024

(54) LENS ASSEMBLY PROVIDED WITH OPTICAL PATH CHANGING UNIT

(71) Applicants: MICRO ACTUATOR CO., LTD., Yongin-si (KR); Dae Soon Lim, Yongin-si (KR)

(72) Inventors: Dae Soon Lim, Yongin-si (KR); Hak Ku Yoon, Suwon-si (KR); Myung Won Choi, Yongin-si (KR)

(73) Assignee: Micro Actuator Co., Ltd., Yongin-si (KR)

( * ) Notice: Subject to any disclaimer, the term of this patent is extended or adjusted under 35 U.S.C. 154(b) by 113 days.

(21) Appl. No.: 17/927,031

(22) PCT Filed: Jun. 16, 2021

(86) PCT No.: PCT/KR2021/007571
§ 371 (c)(1),
(2) Date: Nov. 22, 2022

(87) PCT Pub. No.: WO2022/019485
PCT Pub. Date: Jan. 27, 2022

(65) Prior Publication Data
US 2023/0209196 A1   Jun. 29, 2023

(30) Foreign Application Priority Data

Jul. 22, 2020 (KR) .................. 10-2020-0091250
Mar. 10, 2021 (KR) .................. 10-2021-0031408

(51) Int. Cl.
*H04N 23/68* (2023.01)
*H04N 23/54* (2023.01)
*H04N 23/67* (2023.01)

(52) U.S. Cl.
CPC .......... *H04N 23/686* (2023.01); *H04N 23/54* (2023.01); *H04N 23/675* (2023.01); *H04N 23/687* (2023.01)

(58) Field of Classification Search
CPC .... H04N 23/686; H04N 23/54; H04N 23/675; H04N 23/687; H04N 23/55; H04N 23/58; G02B 5/04; G02B 7/18
See application file for complete search history.

(56) References Cited

U.S. PATENT DOCUMENTS

| 7,589,920 | B2 | 9/2009 | Shin et al. |
| 10,334,146 | B2 | 6/2019 | Im et al. |
(Continued)

FOREIGN PATENT DOCUMENTS

| JP | 2013-125080 A | 6/2013 |
| KR | 10-2004-0101097 A | 12/2004 |
(Continued)

OTHER PUBLICATIONS

Int'l. Search Report, Korean Intellectual Property Office, Sep. 27, 2021, received in Application No. PCT/KR2021/007571, 8 pages, with English translation.
(Continued)

*Primary Examiner* — Mekonnen D Dagnew
(74) *Attorney, Agent, or Firm* — Frost Brown Todd LLP

(57) ABSTRACT

Disclosed is a lens assembly. The disclosed lens assembly comprises: a base; a lens unit which is disposed on one side inside the base and moves forward or rearward in the length-wise direction of the base; an optical path changing unit which is disposed on the other side inside the base, and has a portion fixed to the base and the other portion disposed to be movable inside the base; an auto focusing (AF) drive unit that moves the lens unit forward or rearward; and first (Continued)

and second optical image stabilizing (OIS) drive units that move the optical path changing unit in a tiltable posture.

13 Claims, 24 Drawing Sheets

(56) References Cited

U.S. PATENT DOCUMENTS

| | | | |
|---|---|---|---|
| 10,594,911 | B2 | 3/2020 | Im et al. |
| 11,277,550 | B2 | 3/2022 | Im et al. |
| 2008/0080037 | A1 | 4/2008 | Oh et al. |
| 2008/0253003 | A1 | 10/2008 | Shin et al. |
| 2018/0367714 | A1 | 12/2018 | Im et al. |
| 2019/0212632 | A1* | 7/2019 | Miller .................. H04N 23/55 |
| 2019/0222758 | A1 | 7/2019 | Goldenberg et al. |
| 2019/0268515 | A1 | 8/2019 | Im et al. |
| 2020/0177778 | A1 | 6/2020 | Im et al. |
| 2020/0225442 | A1* | 7/2020 | Weng .................. G02B 27/646 |
| 2022/0159155 | A1 | 5/2022 | Im et al. |

FOREIGN PATENT DOCUMENTS

| | | |
|---|---|---|
| KR | 10-0849580 B1 | 7/2008 |
| KR | 10-2018-097228 A | 8/2018 |
| KR | 10-2018-0137277 A | 12/2018 |

OTHER PUBLICATIONS

Written Opinion, Int'l. Searching Authority, Sep. 27, 2021, received in Int'l Application No. PCT/KR2021/007571, 8 pages, with English translation.

Office Action issued in Korean Patent Application No. 10-2021-0031408; dated Nov. 10, 2023; 13 pages including English translation.

Office Action issued in Korean Patent Application No. 10-2021-0031408; May 29, 2024; 14 pages, including English machine translation.

* cited by examiner

LENS ASSEMBLY PROVIDED WITH OPTICAL PATH CHANGING UNIT

TECHNICAL FIELD

This disclosure relates to a lens assembly applied to a mobile device, and more particularly, to a light path changing unit for changing a light path using a prism, and a miniature lens assembly having the same.

BACKGROUND ART

In general, a camera module (or a lens assembly) is installed in a small mobile device (e.g., a smart phone, etc.) for capturing. The camera module tends to be manufactured in a very small size in consideration of the size and weight of the mobile device.

The ultra-small camera module applied to smartphones these days has an optical zoom function. Optical zoom, which may take close-up pictures of a distantly-located subject, is realized by moving a lens for a predetermined distance inside the camera module. In this case, as the distance between the image sensor and the lens gets farther, high magnification optical zoom may be realized. Therefore, the optical 5x zoom should secure a focal length that is 2.5 times longer than the optical 2x zoom.

For this reason, in order to realize high magnification optical zoom, there may be problem in that the height of the camera module may increase, and the camera placed on the back of the smartphone may protrude.

In order to solve this problem, a method of applying a prism to the camera module has been adopted. When a prism is applied to the camera module, the camera module may be disposed along the length or width direction of the main body of the smartphone, so it is possible to prevent the camera module from protruding excessively from the rear surface of the smartphone.

However, the camera module adopting the prism as described above has a structure for tilting the prism for optical image stabilizing (OIS). However, since the structure for tilting the prism is made very complicated, the assembling property is remarkably low, and it is a factor that increases the manufacturing cost, and there is a problem that maintenance is also not easy due to the complicated structure. In addition, there may be a problem in that the camera module is easily damaged when a shock is added to the camera module.

DISCLOSURE

Technical Problem

It is an object of the disclosure to address the above-mentioned problems, and provide a lens assembly including a prism tilting structure which is easy to manufacture and has product reliability.

Technical Solution

A lens assembly according to an embodiment provides a lens assembly including a base; a lens unit which is disposed on one side inside the base and moves forward or rearward in the length-wise direction of the base; an optical path changing unit disposed in an inner other side of the base, of which a portion is coupled to the base and other portion is movably disposed in the base, an auto focusing (AF) drive unit that moves the lens unit forward or rearward; and first and second optical image stabilizing (OIS) drive units that move the optical path changing unit in a tiltable posture.

The optical path changing unit may include a prism support; a prism coupled to a fixing portion formed in front of the prism support; and a hinge member tiltably support the prism supports with respect to a first axis and a second axis orthogonal with each other.

The fixing portion may be formed of a concave groove shape by a left side wall, a right side wall, and a rear side wall of the prism support, and the prism may have both side surfaces being bonding-coupled to the left side wall and the right side wall of the fixing portion.

A plurality of bonding insertion grooves for inserting an adhesive may be formed in the left side wall and the right side wall of the fixing portion.

The hinge member may include a first portion including a coupling portion coupled to a slit formed on a rear wall of the base; a second portion connected to the first portion through a pair of first hinges; and a third portion connected to a second portion through a pair of second hinges and coupled to a rear portion of the prism support.

The first portion may include a first reinforcing protrusion protrudingly formed in a front direction to add rigidity.

The pair of first hinges may have one end being integrally connected the first reinforcing protrusion and other end being integrally connected to a rear surface of the second portion.

A coupling portion of the first portion may be made of a wedge shape, and the slit may be formed of a shape corresponding to the coupling portion.

The second portion may include a second reinforcing protrusion protruding in a front direction to add rigidity and a second protrusion protrudingly formed in a rear direction.

Thickness of the pair of first hinges may be gradually thinner from both ends toward a center, and thickness of the pair of second hinges may be gradually thinner from both ends toward a center.

The hinge member may be formed by injection molding with a synthetic resin having elasticity.

The first OIS drive unit may tilt the prism support with respect to the pair of first hinges, and the second OIS drive unit may tilt the prism support with respect to the pair of second hinges.

The first OIS drive unit may include a third coil located at a left side of the base; a third magnet coupled with a left side of the prism support to face the third coil; a fourth coil located at a right side of the base; and a fourth magnet coupled at a right side of the prism support to face the fourth coil.

A plurality of balls may be disposed between a bottom of the base and the lens unit, and the plurality of balls may slidably support the lens unit with respect to the base.

The base may include a yoke member embedded in an inside of a bottom of a portion where the lens unit is disposed to be orthogonal with respect to a length-direction, and the yoke member may include a first yoke corresponding to a first magnet of the AF drive unit disposed on one side of the lens unit; and a second yoke corresponding to a second magnet of the AF drive unit disposed on other side of the lens unit.

A damping bond may be applied on between the first portion and the second portion and between the second portion and the third portion.

A damping bond may be applied on both sides of the pair of first hinges, and a damping bond may be applied on both sides of the pair of second hinges. In this case, a receiving groove for receiving the damping bond may be provided by first ribs formed around the pair of first hinges respectively, and a receiving groove for receiving the damping bond may be provided by second ribs around the pair of second hinges, respectively.

BEST MODE FOR CARRYING OUT THE INVENTION

Figure 1:
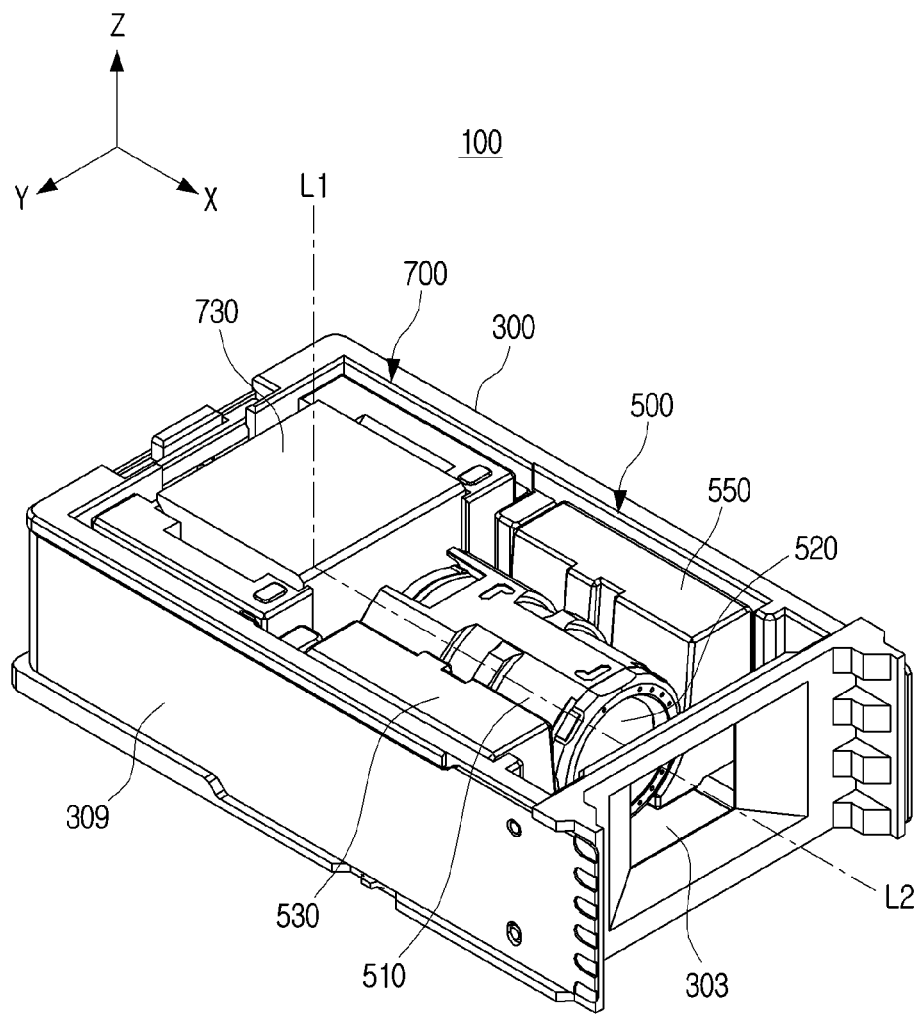
FIG. 1 is an assembled perspective view illustrating a lens assembly according to an embodiment of the disclosure.

Hereinafter, various embodiments will be described in detail with reference to the accompanying drawings. The embodiments described herein may be variously modified. Certain embodiments may be described in the drawings and described in detail in the detailed description. However, the specific embodiments disclosed in the accompanying drawings are to facilitate understanding various embodiments. Accordingly, it is to be understood that the present invention is not limited to the specific embodiments disclosed in the accompanying drawings, and it is to be understood that all equivalents or alternatives included within the spirit and scope of the invention are included.

In this disclosure, the terms first, second, etc. may be used to describe various components, but these components are not limited by the terms discussed above. The terms described above are used only to distinguish one component from another component.

It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

In the disclosure, the size of the miniature lens assembly is smaller than the size of a lens assembly provided in an ordinary digital single lens reflex (DSLR) camera or a mirror-less camera, and may be similar to the size of a lens assembly applied to a smartphone.

When it is decided that a detailed description for the known art related to the disclosure may unnecessarily obscure the gist of the disclosure, the detailed description may be shortened or omitted.

Hereinafter, a lens assembly according to an embodiment of the disclosure will be described with reference to the drawings.

Figure 2:
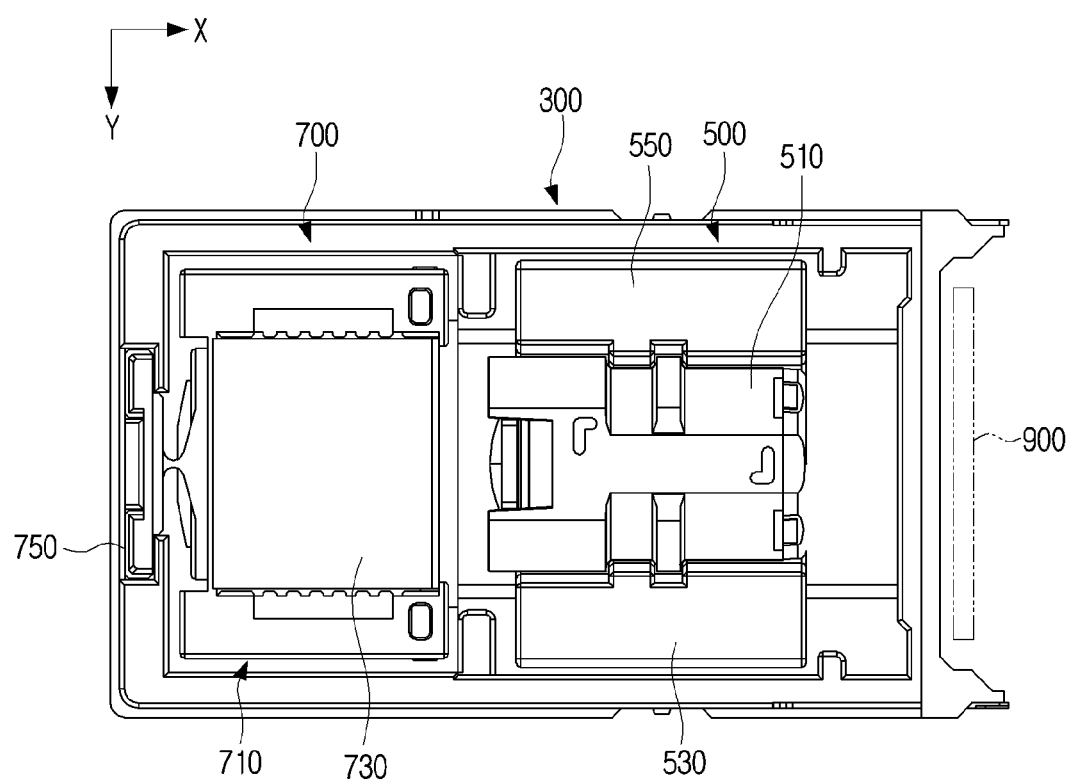
FIG. 2 is a plan view illustrating a lens assembly according to an embodiment of the disclosure.

FIG. 1 is an assembled perspective view illustrating a lens assembly according to an embodiment of the disclosure; FIG. 2 is a plan view illustrating a lens assembly according to an embodiment of the disclosure.

Referring to FIG. 1 and FIG. 2, a lens assembly 100 according to an embodiment of the disclosure may be installed in a mobile device (not shown) such as a relatively small mobile phone and used to capture a subject. The lens assembly 100 may implement functions such as Auto Focusing (AF), Zoom, and Optical Image Stabilizing (OIS).

The lens assembly 100 may include a base 300 installed in a mobile device, a lens unit 500 disposed on an inner side of the base 300, and an optical path changing unit 700 disposed on the other side of the base 300.

The upper portion of the base 300 may be opened so that the lens unit 500 and the optical path changing unit 700 may be inserted into the base 300. The base 300 may be coupled to a predetermined cover (not shown) capable of closing the upper portion of the base 300 so that the lens unit 500 and the optical path changing unit 700, which are inserted therein, are protected from external impacts and are not contaminated by foreign materials.

One printed circuit board 309 is disposed to surround the left and right sides and the rear side of the base 300. The printed circuit board 309 may be a flexible printed circuit board (FPCB).

On the printed circuit board 309, first and second coils 410 and 430 that are part of an AF drive unit, third and fourth coils 610 and 620 that are part of a first OIS drive unit, and fifth and sixth coils 630 and 640 that are part of a second OIS drive unit may be mounted, respectively.

The lens unit 500 may be disposed to move forward or backward along the length direction (X-axis direction) of the base 300 and may perform an AF and a zoom function.

The optical path changing unit 700 may change an optical path to guide external light of the mobile device toward the lens unit 500 and simultaneously perform an OIS function. The optical path changing unit 700 may tilt the prism at a predetermined angle with respect to the Z-axis and the Y-axis.

The image sensor 900 may be disposed adjacent to a light passing hole 303 of the base 300 as illustrated in FIG. 2, and may be disposed outside the base 300 in a state of being mounted on a predetermined substrate (not shown). In this case, the image sensor 900 may be mounted on a substrate (not shown) appropriately fixed to a structure in the mobile device.

Although not shown in the drawings, the image sensor 900 may be disposed parallel to the longitudinal direction of the base 300. In this case, the light passing through the lens unit 500 may be reflected by a separate mirror (not shown) and guided to the image sensor 900.

Each feature of the lens assembly 100 will be described in detail with reference to the drawings.

Figure 3:
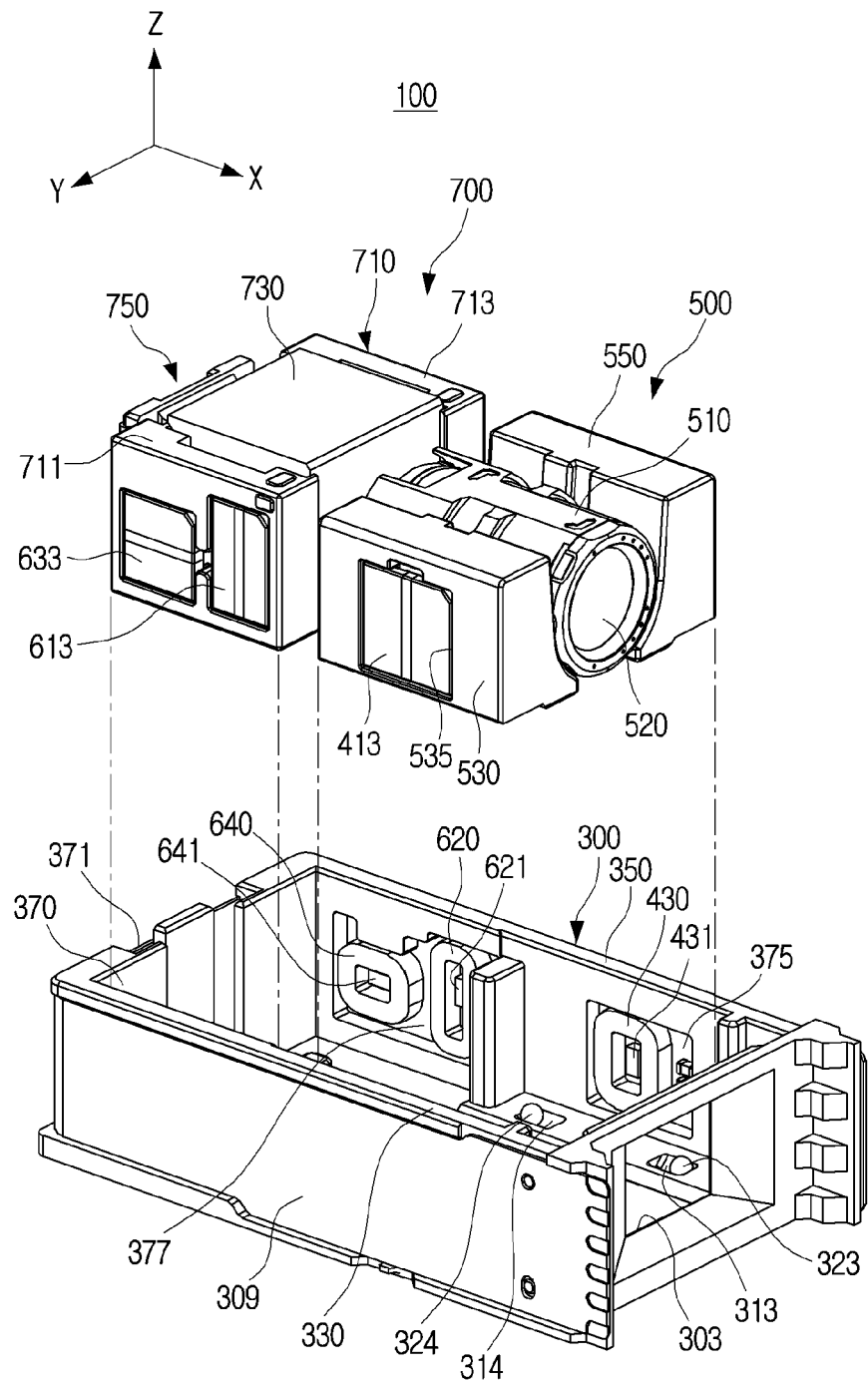
FIGS. 3 and 4 are exploded perspective views of the lens assembly viewed from different directions according to an embodiment of the disclosure.
Figure 4:
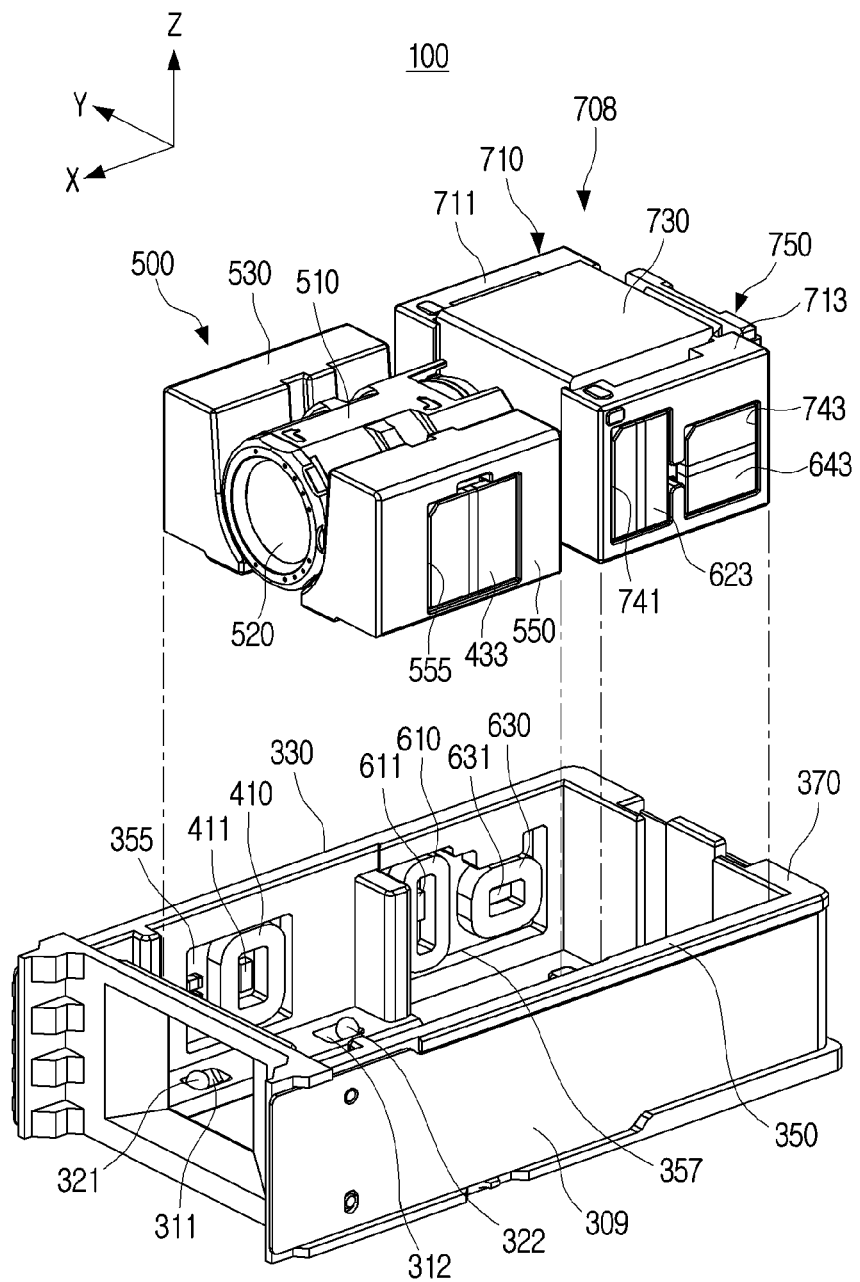
Figure 5:
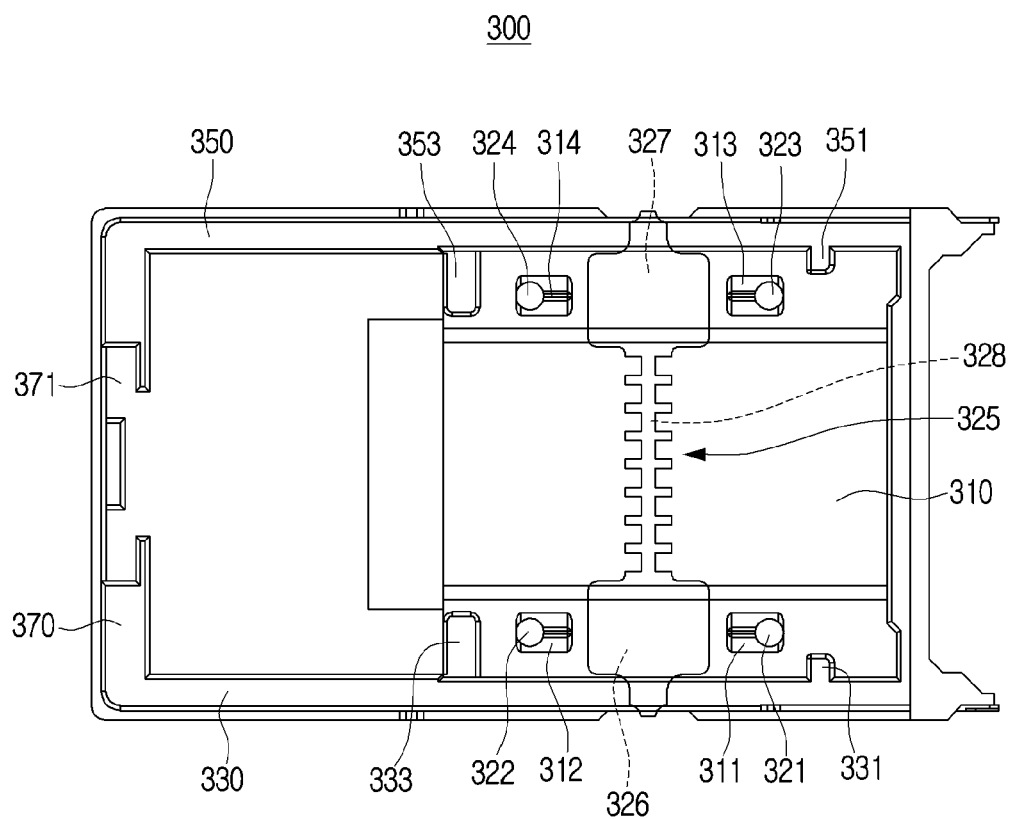
FIG. 5 is a plan view illustrating a base of a lens assembly according to an embodiment of the disclosure.

FIGS. 3 and 4 are exploded perspective views of the lens assembly viewed from different directions according to an embodiment of the disclosure; FIG. 5 is a plan view illustrating a base of a lens assembly according to an embodiment of the disclosure.

Referring to FIGS. 3 and 4, the base 300 may be formed of a box shape of about a rectangular parallelepiped.

The base 300 may insert and withdraw the lens unit 500 and the optical path changing unit 700 through the opening as an opening is formed at an upper portion of the base 300. The base 300 may have a light passing hole 303 formed at a front portion adjacent to an inner side where the lens unit 500 is disposed.

In the base 300, first and second through holes 355 and 375, into which a portion of an AF drive unit is inserted, may be formed in the left wall 330 and the right wall 350, respectively, and third and fourth through holes 357 and 377 into which a portion of the first and second OIS drive units are inserted may be formed.

The AF drive unit may include the first and second coils 410, 430 and the first and second magnets 413, 433.

The first and second through holes 355 and 375 may be disposed at positions facing the left and right sides of the lens unit 500, respectively. The first coil 410 may be disposed in the first through hole 355, and the first magnet 413 facing the first coil 410 at a predetermined interval may be disposed on the left side of the lens unit 500.

The second coil 430 may be disposed in the second through hole 375, and the second magnet 433 facing the second coil 430 at a predetermined interval may be disposed on the right side of the lens unit 500.

As described above, the AF drive unit is disposed in the lens unit 500 in which the first and second magnets 413 and 433, which are disposed on the base 300 for maintaining a fixed state of the first and second coils 410 and 430 forming a part, are disposed in the movable lens unit 500.

In this arrangement, when a current is applied to the first coil 410 in a forward or reverse direction, attractive force or repulsive force is generated between the first coil 410 and the first magnet 413, and when a current is applied to the second coil 430 in a forward or reverse direction, attractive force or repulsive force generated between the second coil 430 and the second magnet 433 is generated. Accordingly, the lens unit 500 may move forward or backward along the second optical axis direction by the operation of the AF drive unit. The second optical axis direction refers to an X-axis direction that is reflected by a prism 730 and faces the lens unit 500.

The first OIS drive unit may include third and fourth coils 610 and 620, third and fourth magnets 613 and 623, and the second OIS drive unit may include fifth and sixth coils 630, 640 and fifth and sixth magnets 633 and 643. The first OIS drive unit is disposed closer to the lens unit 500 than the second OIS drive unit, and the second OIS drive unit is disposed closer to the rear wall 370 of the base 300 than the first OIS drive unit.

The third and fourth through holes 357, 377 may be disposed at positions facing each of the left side and right side of the optical path changing unit 700.

Third and fifth coils 610 and 630 may be disposed in the third through hole 357, and fourth and sixth coils 620 and 640 may be disposed in the fourth through hole 377. In this example, the third and fourth coils 610 and 620 are disposed at positions facing each other, and the fifth and sixth coils 630 and 640 are disposed at positions facing each other.

In the left side of the optical path changing unit 700, a third magnet 613 facing the third coil 610 at a predetermined interval, and a fifth magnet facing the fifth coil 630 at a predetermined interval 633 may be placed.

The optical path changing unit 700 may be disposed with the fourth magnet 623 which faces the fourth coil 620 with a predetermined spacing in the right side and the sixth magnet 643 which faces the sixth coil 640 with a predetermined spacing.

In this way, the first OIS drive unit is disposed on the base 300 in which the third and fourth coils 610, 620 forming a part of the first OIS drive unit are disposed in the base 300 in a fixed state and the rest of the third and fourth magnets 613, 623 are disposed at a tiltable optical path changing unit 700.

Under this arrangement, when a current is applied to the third coil 610 in the forward or reverse direction, attractive or repulsive force is generated between the third coil 610 and the third magnet 613, and an attractive or repulsive force generated between the fourth coil 620 and the fourth magnet 623 occurs when a current is applied in the forward or reverse direction. Accordingly, the optical path changing unit 700 may be tilted left or right about the Z axis parallel to the first optical axis L1 (see FIG. 1) by the operation of the first OIS drive unit.

The second OIS drive unit is arranged on the base 300 in which the fifth and sixth coils 630, 650 forming a part maintain a fixed state, and the fifth and sixth magnets 633, 643 forming the rest is disposed on the tiltable optical path changing unit 700.

Under this arrangement, when a current is applied to the fifth coil 630 in the forward or reverse direction, attractive or repulsive force is generated between the fifth coil 630 and the fifth magnet 653, and an attractive or repulsive force generated between the sixth coil 440 and the sixth magnet 443 occurs when a current is applied in the forward or reverse direction to the sixth coil 640. Accordingly, the optical path changing unit 700 may be tilted to the left or right about the Y-axis direction disposed at right angles to the Z-axis and the X-axis, respectively, by the operation of the second OIS drive unit.

As described above, in the lens assembly 100, the optical path changing unit 700 may be controlled to be tilted about the Z-axis and the Y-axis by the operation of the first and second OIS drive units to implement the OIS functionality.

Referring to FIG. 5, the base 300 may have a coupling groove 371 to which a portion of the hinge member 750 to be described later is coupled to a rear side wall 370 adjacent to the other inner side in which the optical path changing unit 700 is disposed.

The base 300 may include a pair of forward stoppers 331 and 351 for limiting the maximum forwarding distance of the lens unit 500 and a pair of reverse stoppers 333 and 353 for limiting the maximum reverse distance of the lens unit 500.

The pair of forward stoppers 331, 351 may be formed at a facing position in the inner side surface of the left side wall 330 and the inner side surface of the right side wall 350.

The pair of reverse stoppers 333 and 353 may be formed at positions facing each other on the inner surface of the left wall 330 and the inner surface of the right wall 350, respectively. The pair of reverse stoppers 333 and 353 are located closer to the optical path changing unit 700 than the pair of forward stoppers 331 and 351.

The lens unit 500 may move forward and backward by a predetermined distance between the pair of forward stoppers 331 and 351 and the pair of reverse stoppers 333 and 353, and the maximum forward distance and the maximum reverse distance are limited by the pair of forward stoppers 331 and 351 and the pair of reverse stoppers 333 and 353.

In the base 300, four grooves 311, 312, 313, 314 are formed at a bottom of a portion where the lens unit 500 is disposed, and the balls 321, 322, 323, 324 are disposed on each groove one by one.

The two grooves 311 and 312 are spaced apart from each other along the longitudinal direction of the base 300 and are disposed adjacent to the left wall 330. The remaining two grooves 313 and 314 are spaced apart from each other along the longitudinal direction of the base 300 and are disposed adjacent to the right wall 350.

Four grooves 311, 312, 313, 314 may be formed to have a predetermined length along with a length direction of the base 300 so that balls 321, 322, 323, 324 are movable.

Two balls 321 and 322 roll-support the first supporter 530 of the lens unit 500 to move forward and backward in the X-axis direction parallel to the second optical axis L2 (see FIG. 1), and the remaining two balls 323 and 324 roll-support the second supporter 550 of the lens unit 500 to move forward and backward in the X-axis direction.

The yoke member 325 may be disposed in a substantially perpendicular direction with respect to the longitudinal direction of the base 300 inside the bottom of the portion where the lens unit 500 is disposed. The yoke member 325 may be embedded in the base 300 by insert injection molding.

The yoke member 325 may include the first yoke portion 326, the second yoke portion 327, and the connector 328 interconnecting the first and second yoke portions 326, 327.

The first yoke portion 326 may be disposed adjacent to the left wall 330 to correspond to the first magnet 413, and the second yoke portion 327 may be disposed adjacent to the right wall 350 to correspond to the second magnet 433.

The first yoke portion 326 may be disposed between the grooves 311 and 322 so as not to interfere with the recesses 311 and 322, and the second yoke portion 327 may be disposed between the other recesses 313 and 314 so as not to interfere with the other recesses 313 and 314.

The yoke member 325 may be formed of a material having magnetism so as to have an attractive force with respect to the first and second magnets 413 and 433 of the lens unit 500. The yoke member 325 maintains the lens unit 500 in a predetermined position when no current is applied to the AF drive unit. In addition, when the lens unit 500 moves forward or backward, the yoke member 325 may allow the four balls 321, 322, 323, and 324 to be in close contact with the first and second supporters 530 and 550 by pulling the lens unit 500 toward the bottom of the base 300. Accordingly, the lens unit 500 may accurately control forward and backward movement.

Figure 6:
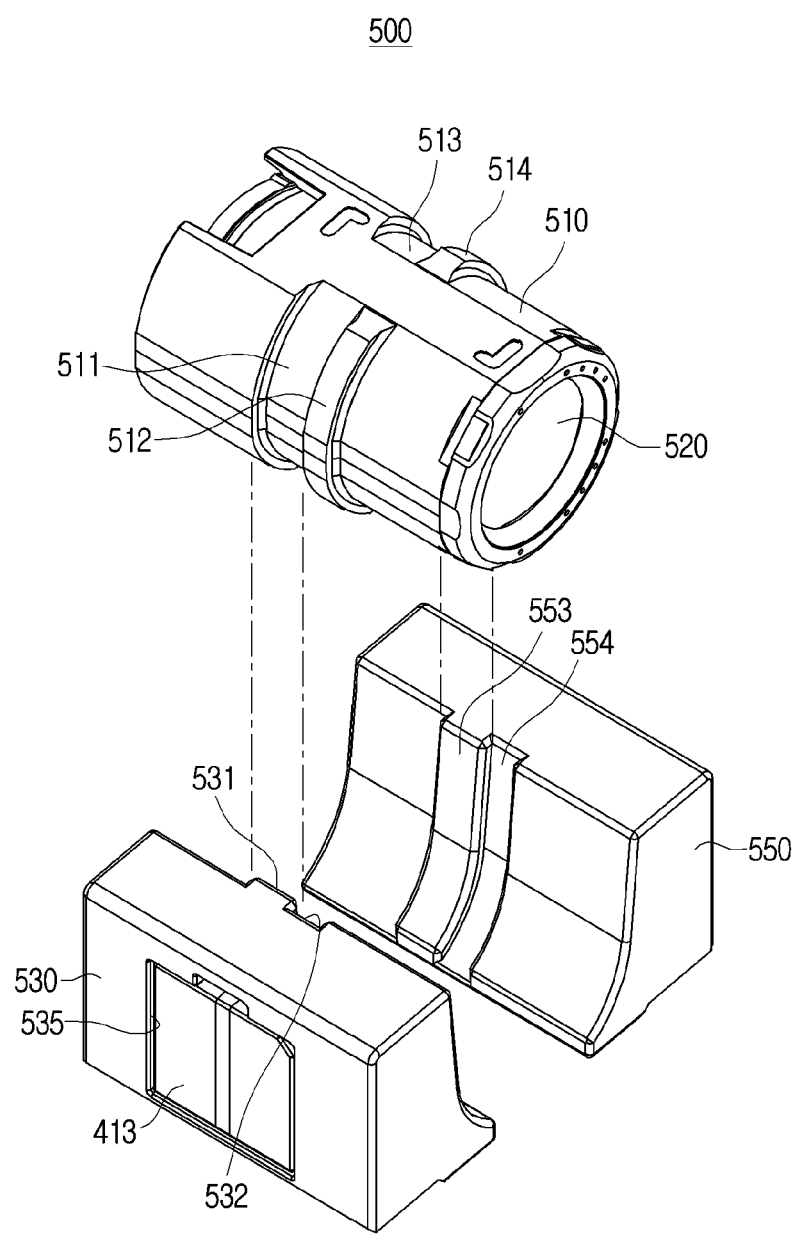
FIG. 6 is an exploded perspective view illustrating a lens unit of the lens assembly and a pair of support blocks supporting the lens unit according to an embodiment of the disclosure.
Figure 7:
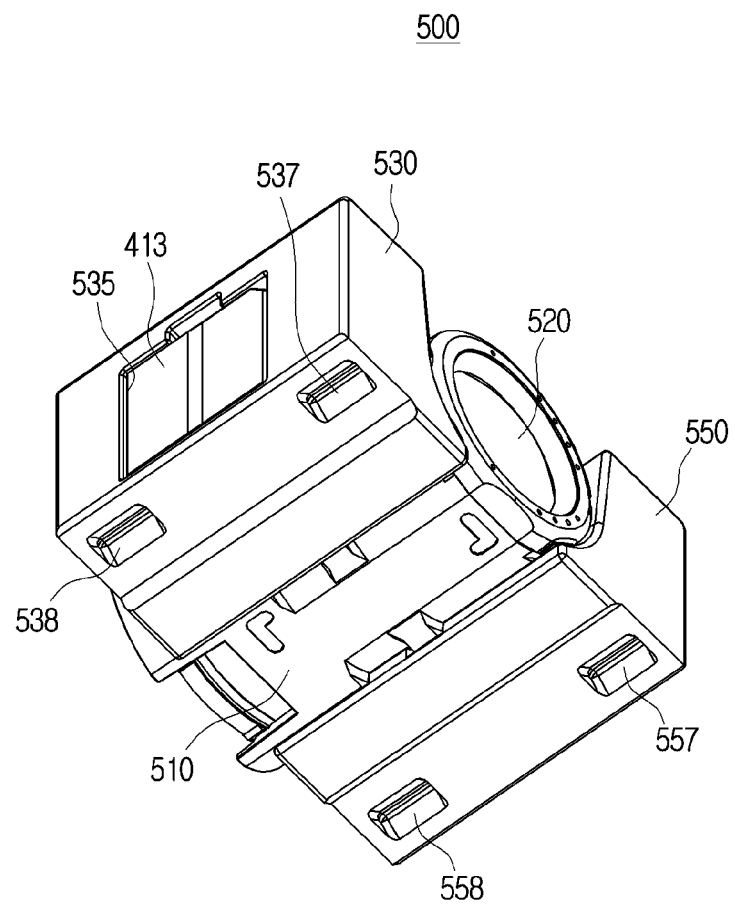
FIG. 7 is an assembled perspective view illustrating a lens unit of the lens assembly and a pair of support blocks supporting the lens unit according to an embodiment of the disclosure.

FIG. 6 is an exploded perspective view illustrating a lens unit of the lens assembly and a pair of support blocks supporting the lens unit according to an embodiment of the disclosure, FIG. 7 is an assembled perspective view illustrating a lens unit of the lens assembly and a pair of support blocks supporting the lens unit according to an embodiment of the disclosure.

Referring to FIG. 6, the lens unit 500 may include a lens barrel 510 and a plurality of lenses 520 disposed along with an optic axis direction inside the lens barrel 510.

In this example, the plurality of lenses 520 may be formed of a plurality of lens groups. For example, a first lens group, a second lens group, and a third lens group may be disposed inside the lens barrel 510 with a predetermined interval.

The lens barrel 510 may be uneven-coupled to both sides of the first and second support blocks 530 and 550, and may move forward or backward in the X-axis direction parallel to the second optical axis L2 (see FIG. 1) in the base 300 by the first and second support blocks 530 and 550.

The lens barrel 510 and the first and second support blocks 530, 550 may have an uneven coupling structure for uneven coupling between them.

The lens barrel 510 may be formed with the first and second uneven coupling grooves 511, 513 along with an outer circumference at both ends and may be formed with first and second uneven coupling protrusions 512, 514.

The first support block 530 may include a third uneven coupling protrusion 531 coupled to the first uneven coupling groove 511 of the lens barrel 510, and a third uneven coupling groove 532 to which the first uneven coupling protrusion 512 of the lens barrel 510 is coupled.

The second support block 550 may be formed with the fourth uneven coupling protrusion 553 coupled to the second uneven coupling groove 513 of the lens barrel 510 and the fourth uneven coupling groove 554 to which the second uneven coupling protrusion 514 is coupled.

Referring to FIG. 7, in the first support block 530, an insertion groove 535 into which the first magnet 413 of an AF drive unit is inserted may be formed on one side of the first support block 530 facing the left wall 330 of the base 300. As described above, the first magnet 413 may be disposed to face the first coil 410. The first coil 410 may have a closed curve shape, and a hall sensor 411 (see FIG. 4) may be disposed inside the closed curve. The movement distance of the lens unit 500 may be controlled by sensing the forward or backward movement distance of the first magnet 413 through the hall sensor 411.

The first support block 530 may have a pair of recesses 537 and 538 formed at a lower portion thereof. The disposition interval between the pair of recesses 537 and 538 may be equal to the interval between the pair of recesses 311 and 312 (see FIG. 5) formed in the base 300. The balls 321 and 322 inserted into the pair of recesses 311 and 312 of the base 300 are also inserted into a pair of recesses 537 and 538 of the first support block 530, respectively. Accordingly, the first support block 530 is slidably supported along the X-axis direction by the pair of balls 321 and 322 (see FIG. 5).

The second support block 530 may have an insertion groove 555 (see FIG. 4) into which the second magnet 433 of the AF drive unit is inserted on one side of the second support block 530 facing the right wall 350 of the base 300. As described above, the second magnet 433 may be disposed to face the second coil 430. Like the first coil 410, the second coil 430 may have a closed curve shape, and a hall sensor 431 (see FIG. 3) may be disposed inside the closed curve.

Like the first support block 530, the second support block 550 may be slidably supported by the balls 323 and 324 (see FIG. 5). Referring to FIG. 7, a pair of recesses 557 and 558 may be formed at a lower portion of the second support block 550. The interval between the pair of recesses 557 and 558 may be equal to the interval of the pair of grooves 313 and 314 (see FIG. 5) formed in the base 300. The balls 323 and 324 inserted into the pair of recesses 313 and 314 of the base 300 are also inserted into a pair of recesses 557 and 558 of the second support block 550, respectively.

Figure 8:
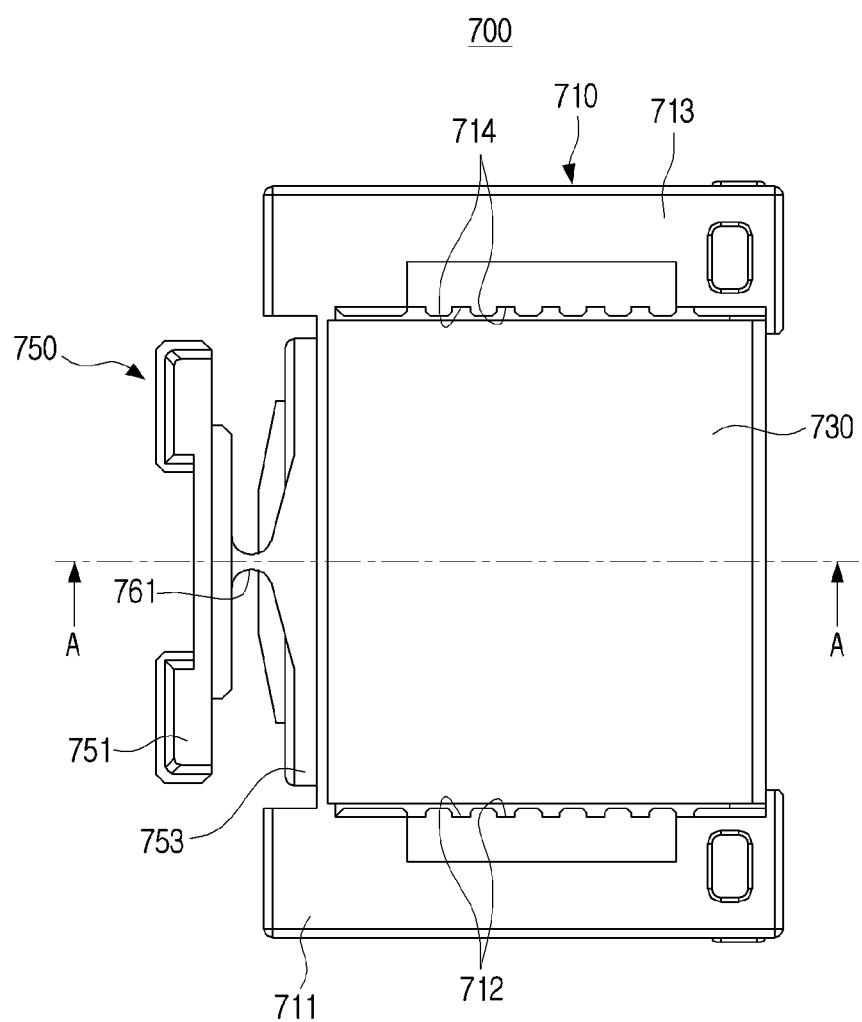
FIG. 8 is a plan view illustrating an optical path changing unit of a lens assembly according to an embodiment of the disclosure.
Figure 9:
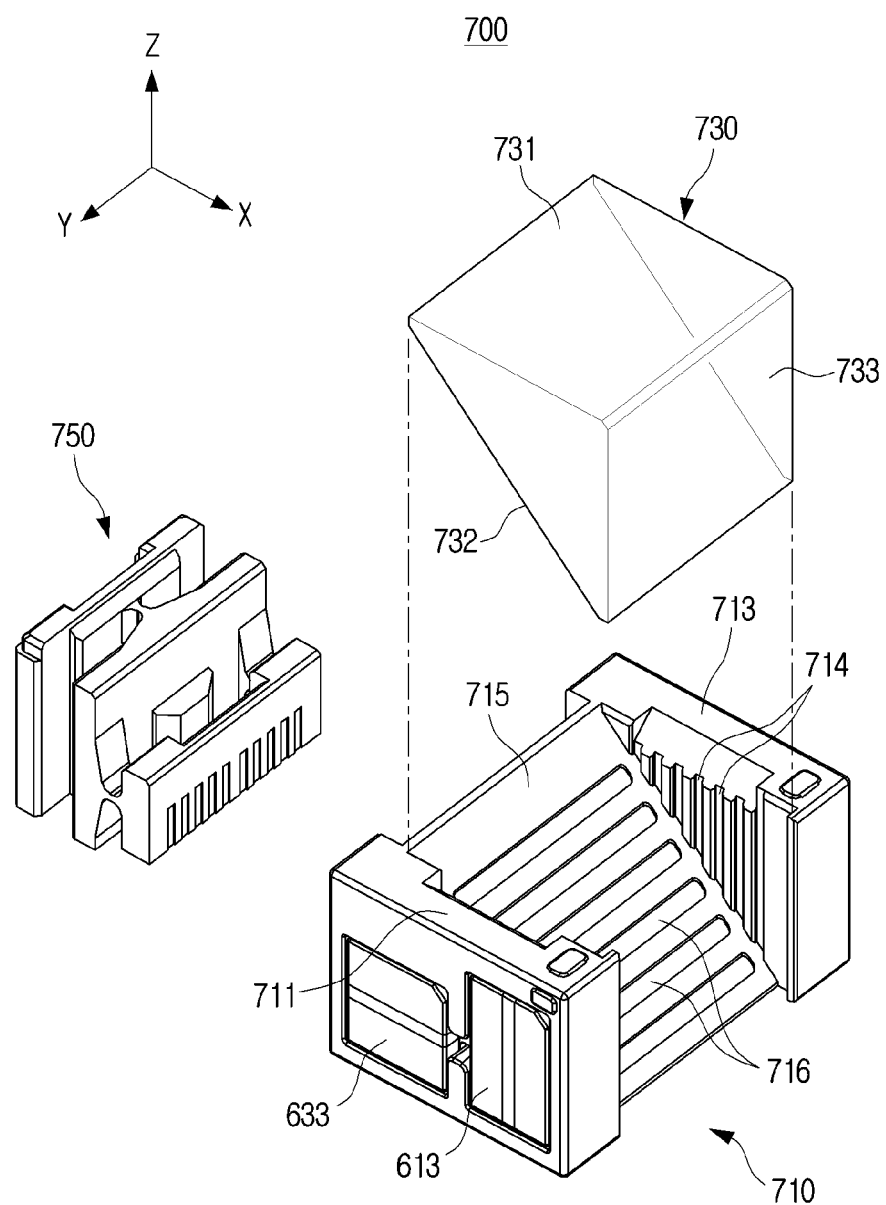
FIG. 9 is an exploded perspective view illustrating an optical path changing unit of a lens assembly according to an embodiment of the disclosure.

FIG. 8 is a plan view illustrating an optical path changing unit of a lens assembly according to an embodiment of the disclosure, FIG. 9 is an exploded perspective view illustrating an optical path changing unit of a lens assembly according to an embodiment of the disclosure.

The optical path changing unit 700 may compensate for shaking by tilting the prism 730 with a relative displacement corresponding to the handshake so as to prevent the quality of the captured image from being degraded due to a hand tremor or the like of the user during capturing of the subject. In this case, the prism 730 fixed to the prism support 710 is tilted at a predetermined angle about two axes (the Z-axis and the Y-axis) orthogonal to each other.

Referring to FIGS. 8 and 9, the optical path changing unit 700 may include a prism 730 for changing an optical path, a prism support 710 to which the prism 730 is fixed, and a hinge member 750 to tiltably support the prism support 710.

Hereinbelow, each configuration of the optical path changing unit 700 will be described in detail.

Figure 10:
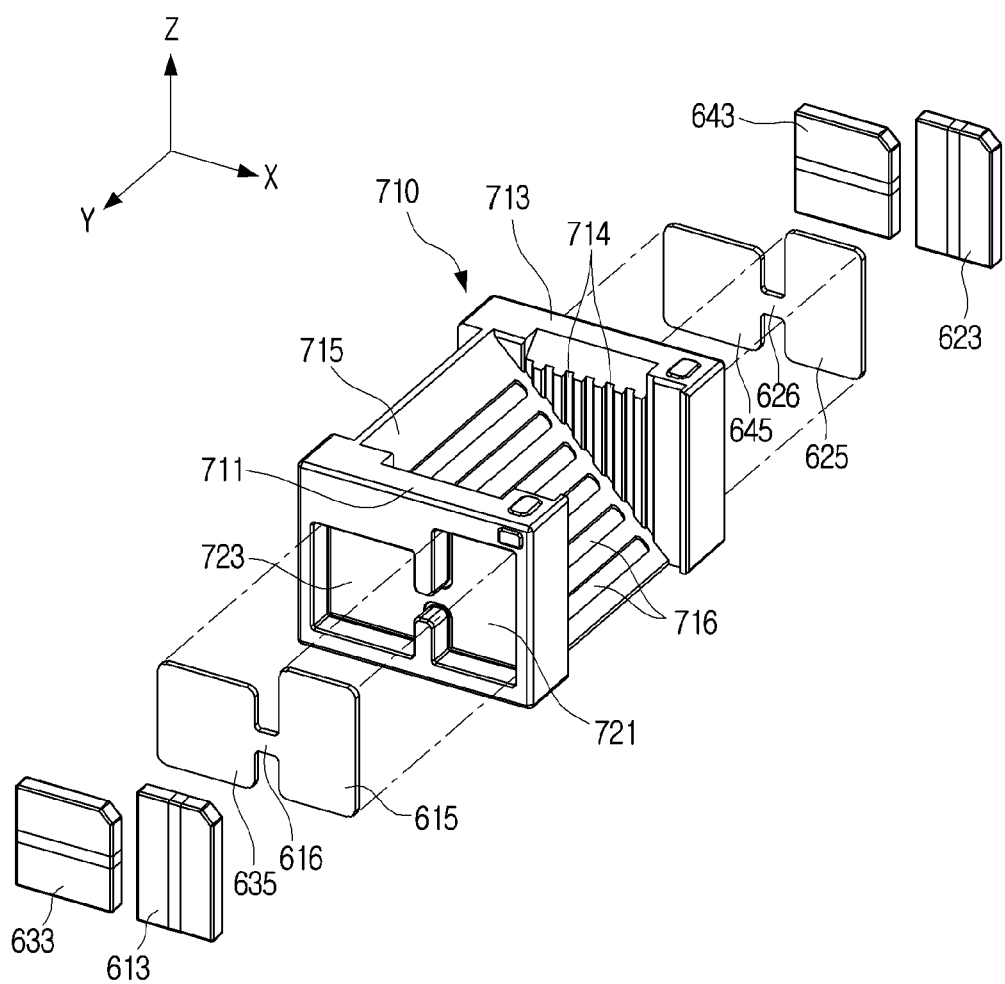
FIG. 10 is an exploded perspective view illustrating the prism support of the optical path changing unit shown in FIG. 9.
Figure 11:
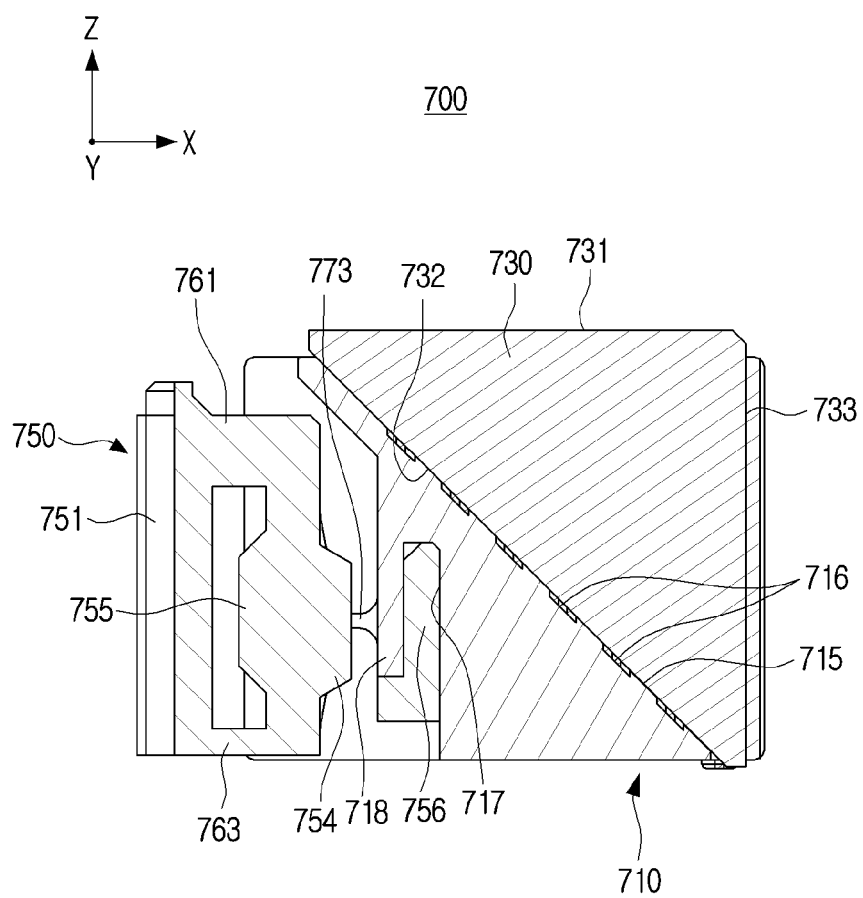
FIG. 11 is a cross-sectional view taken along line A-A of FIG. 8.
Figure 12:
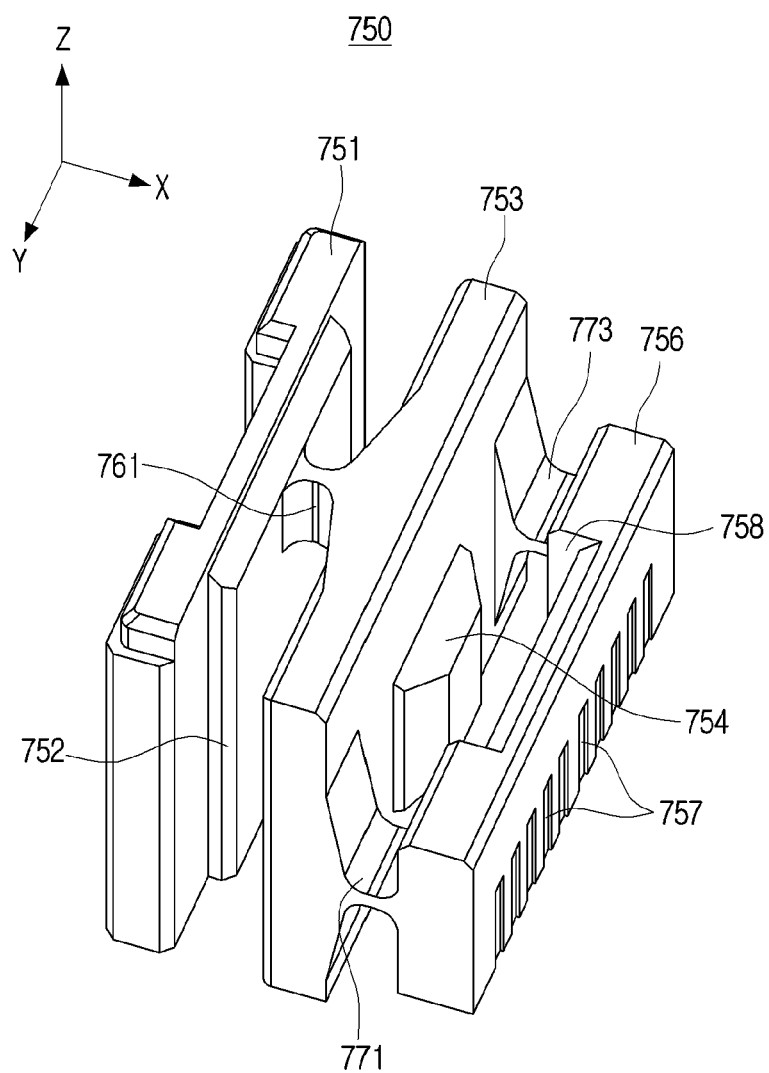
FIG. 12 is a perspective view illustrating a hinge member of the optical path changing unit shown in FIG. 9.
Figure 13:
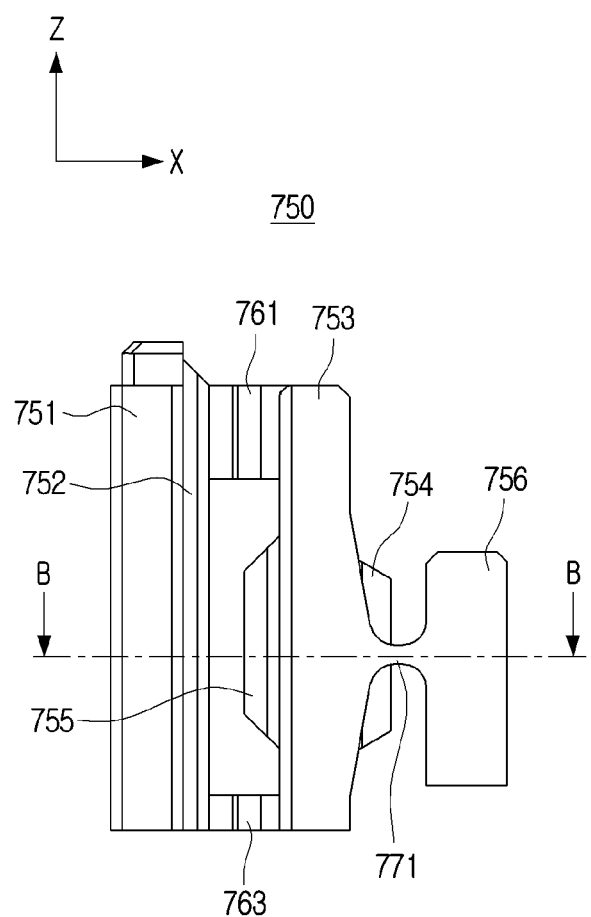
FIG. 13 is a side view illustrating the hinge member of the optical path changing unit shown in FIG. 12.
Figure 14:
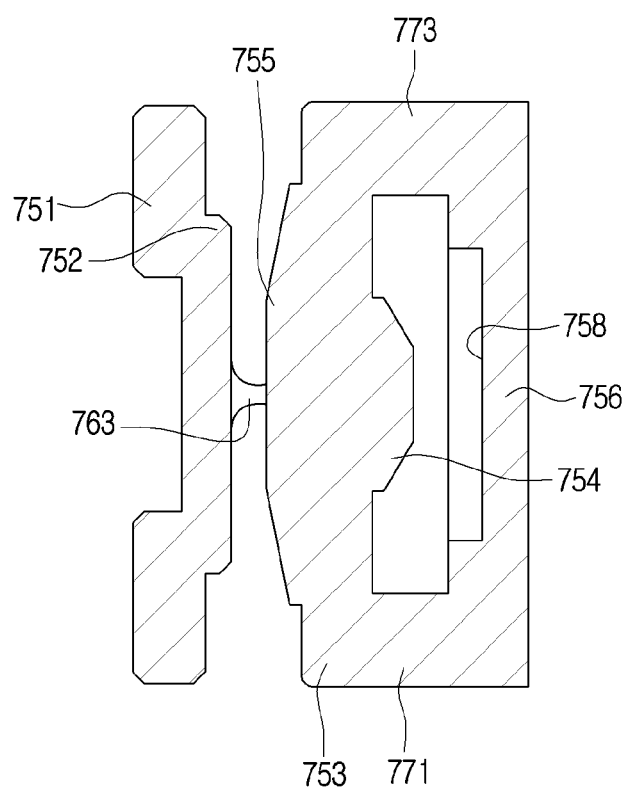
FIG. 14 is a cross-sectional view taken along line B-B of FIG. 13.

FIG. 10 is an exploded perspective view illustrating the prism support of the optical path changing unit shown in FIG. 9, FIG. 11 is a cross-sectional view taken along line A-A of FIG. 8, FIG. 12 is a perspective view illustrating a hinge member of the optical path changing unit shown in FIG. 9, FIG. 13 is a side view illustrating the hinge member of the optical path changing unit shown in FIG. 12, and FIG. 14 is a cross-sectional view taken along line B-B of FIG. 13.

Referring to FIG. 10, in the prism support body 710, a prism 730 is fixed to a fixing portion formed in front. The fixing portion may be formed in a concave shape by the left block 711, the right block 713, and the inclined surface 715 to correspond to the shape of the prism 730.

The outer surface of the left block 711 is formed with coupling grooves 721 and 723 into which a third magnet 613 that is a part of the first OIS drive unit and a fifth magnet 633 that is a part of the second OIS drive unit are inserted. A plurality of bonding injection grooves (not shown) may be formed on the inner surface of the left block 711 to be spaced apart from each other in the vertical direction (Z-axis direction).

The yokes 615 and 635 are first inserted into the coupling grooves 721 and 723, and then the third magnet 613 and the fifth magnet 633 are inserted into the coupling grooves 721 and 723. The yokes 615 and 635 may be integrally formed through a connection portion 616.

The third magnet 613 may be disposed to face the third coil 610 as described above, and may form a first OIS drive unit together with the third coil 610. The third coil 610 may have a closed curve shape, and a hall sensor 611 (see FIG. 4) may be disposed inside the closed curve. The tilting angle of the prism support 710 may be controlled by sensing the degree of tilting of the third magnet 613 through the hall sensor 611.

The fifth magnet 633 may be disposed to face the fifth coil 630 as described above, and may form a second OIS drive unit together with the fifth coil 630. The fifth coil 630 may have a closed curve shape, and a hall sensor 631 (see FIG. 4) may be disposed inside the closed curve. The tilting angle of the prism support 710 may be controlled by sensing the degree of tilting of the fifth magnet 633 through the hall sensor 631.

A plurality of bonding injection grooves may be injected with an adhesive, and a left side of the prism 730 may be attached by an adhesive. The adhesive may inject an adhesive into a plurality of bonding injection grooves in a state in which the prism 730 is inserted into the fixing portion of the prism support 710.

The right block 713 may be symmetrical to the left block 711. Coupling grooves 741 and 743 into which a fourth magnet 623 that is a part of the first OIS drive unit and a sixth magnet 643 that is a part of the second OIS drive unit are inserted is formed on the outer surface of the right block 713. A plurality of bonding injection grooves 714 may be formed on the inner surface of the right block 713 to be spaced apart from each other in the vertical direction (Z-axis direction).

The yokes 625 and 645 are first inserted into the coupling grooves 741 and 743, and then the fourth magnet 623 and the sixth magnet 643 are inserted into the coupling grooves 741 and 743, respectively. The yokes 625 and 645 may be integrally formed through the connection portion 626.

The fourth magnet 623 may be disposed to face the fourth coil 620 as described above, and may form a first OIS drive unit together with the fourth coil 620. The fourth coil 620 may have a closed curve shape, and a hall sensor 621 (see FIG. 3) may be disposed inside the closed curve. The tilting angle of the prism support 710 may be controlled by sensing the degree of tilting of the fourth magnet 623 through the hall sensor 621.

The sixth magnet 643 may be disposed to face the sixth coil 640 as described above, and may form a second OIS drive unit together with the sixth coil 640. The sixth coil 640 may have a closed curve shape, and a hall sensor 641 (see FIG. 3) may be disposed inside the closed curve. The tilting angle of the prism support 710 may be controlled by sensing the degree of tilting of the sixth magnet 643 through the hall sensor 641.

The adhesive may be injected into the plurality of bonding injection grooves 714, and the right side of the prism 730 may be attached with the adhesive. The adhesive may inject an adhesive into the plurality of bonding injection grooves 714 in a state in which the prism 730 is inserted into the fixing portion of the prism support 710.

The inclined surface 715 corresponds to the reflective surface 732 (see FIG. 11) of the prism 730, and a plurality of reinforcing grooves 716 may be formed in parallel at intervals along the width direction (Y-axis direction) of the prism support 710.

The plurality of reinforcing grooves 716 may add rigidity of the prism support 710 so as to prevent bending or twisting of the prism support 710.

Referring to FIG. 11, the prism support 710 may have a coupling groove 717 into which the third portion 756 of the hinge member 750 is fitted and coupled to the rear portion of the prism support 710. The protrusion 718 forming a portion of the coupling groove 717 may be coupled to the recess 758 of the third portion 756 of the hinge member 750.

The coupling groove 717 of the prism support 710 and the third portion 756 of the hinge member 750 may be coupled to each other in a mutually compression state. When an adhesive is injected into the coupling groove 717 of the prism support 710, the third portion 756 of the hinge member 750 may be bonded to the coupling groove 717 of the prism support 710.

The prism 730 may change the optical path capable of OIS by reflecting the light incident from the outside of the mobile device to the side of the lens unit 500 while titling along with the prism support 710.

The hinge member 750 supports the prism support 710 so that the prism support 710 may tilt about the Z-axis and tilt around the Y-axis by the operation of the first and second OIS drive units. The hinge member 750 may be formed by injection molding using a synthetic resin. In this case, the synthetic resin may be made of a material having a predetermined elasticity.

Referring to FIGS. 12 to 14, the hinge member 750 may include first to third portions 751, 753, and 756, a pair of first hinges 761 and 763 connecting the first and second portions 751 and 753, and a pair of second hinges 771 and 773 connecting the second portion 753 and the third portion 756.

The first portion 751 may be coupled to the slot 371 formed on the rear side wall 370 of the base 300. The first portion 751 may be formed with the first reinforcing protrusion 752 protruding toward a surface facing the second portion 753.

The first reinforcing protrusion 752 may increase the thickness of the first portion 751 and increase its own rigidity. Accordingly, the first portion 751 may prevent the first portion 751 from being bent or twisted due to the weight of the prism support 710 and the prism 730 through the first reinforcing protrusion 752, and thus accurate OIS control may be possible.

The pair of first hinges 761 and 763 are disposed between the first portion 751 and the second portion 753 and interconnect the first portion 751 and the second portion 753. The pair of first hinges 761 and 763 may be located on the Z-axis, and may be the central axis of the left and right tilting operations of the prism support 710 according to the operation of the first OIS drive unit.

The pair of first hinges 761 and 763 are disposed up and down at predetermined intervals, and one end of the pair of first hinges 761 and 763 is integrally connected to the first reinforcing protrusion 752 of the first portion 751 and the other end thereof is integrally connected to the rear surface of the second portion 753.

The thickness of the pair of first hinges 761 and 763 may have an increasingly thinner thickness from both ends toward the center. This considers that the pair of first hinges 761 and 763 may be smoothly tilted with respect to the Z axis according to the operation of the first OIS drive unit. Further, the rigidity and flexibility of the pair of first hinges 761 and 763 may be appropriately adjusted by adjusting the thickness of the middle portion of the pair of first hinges 761 and 763.

The first hinge 761 positioned at the upper side among the pair of second hinges may have a longer length in the Z-axis direction than the first hinge 763 positioned at the lower side. However, the embodiment is not limited thereto, and the length of the first hinge 763 positioned at the lower side may be longer than the length of the first hinge 761 at the upper side in the Z-axis direction, or the Z-axis direction length of the pair of first hinges 761 and 763 may be formed to be the same.

The second portion 753 may include the second reinforcing protrusion 754 protruding in a forward direction and the third reinforcing protrusion 755 protruding in a rearward direction.

The second and third reinforcing protrusions 754 and 755 may increase the rigidity of the second portion 753 in the same manner as the first reinforcing protrusion 752, thereby preventing the second portion 753 from being bent or twisted due to the weight of the prism support 710 and the prism 730.

The pair of second hinges 771 and 773 are disposed between the second portion 753 and the third portion 756 and interconnect the second portion 753 and the third portion 756. The pair of second hinges 771 and 773 may be located on the Y-axis, and may be the central axis of the vertical tilting operation of the prism support 710 according to the operation of the second OIS drive unit.

The pair of second hinges 771 and 773 may be disposed left and right at predetermined intervals, and each one end is integrally connected to the front surface of the second portion 753 and the other end is integrally connected to the rear surface of the third portion 756.

Like the pair of first hinges 761 and 763, the pair of second hinges 771 and 773 may be gradually thinner from both ends toward the center. This considers that the pair of second hinges 771 and 773 may be smoothly tilted with respect to the Y axis according to the operation of the second OIS drive unit. As the thickness of the middle portion of the pair of second hinges 771 and 773 is adjusted, the rigidity and flexibility of the pair of second hinges 771 and 773 may be appropriately adjusted.

The third portion 756 is fixed to the coupling groove 717 of the prism support 710. The third portion 756 may have a plurality of bonding injection grooves 757 formed on the front surface in parallel to be spaced apart from each other along the Z-axis direction. The adhesive may be injected into the plurality of bonding injection grooves 714 in a state in which the third portion 756 is inserted into the coupling groove 717 of the prism support 710. Accordingly, the third portion 756 may be fitted into and bonded to the coupling groove 717 of the prism support 710.

The optical path changing unit 700 of the above-described configuration of the lens assembly 100 may have a somewhat different structure. Hereinafter, a configuration according to another example of an optical path changing unit will be described in detail with reference to the accompanying drawings.

Figure 15:
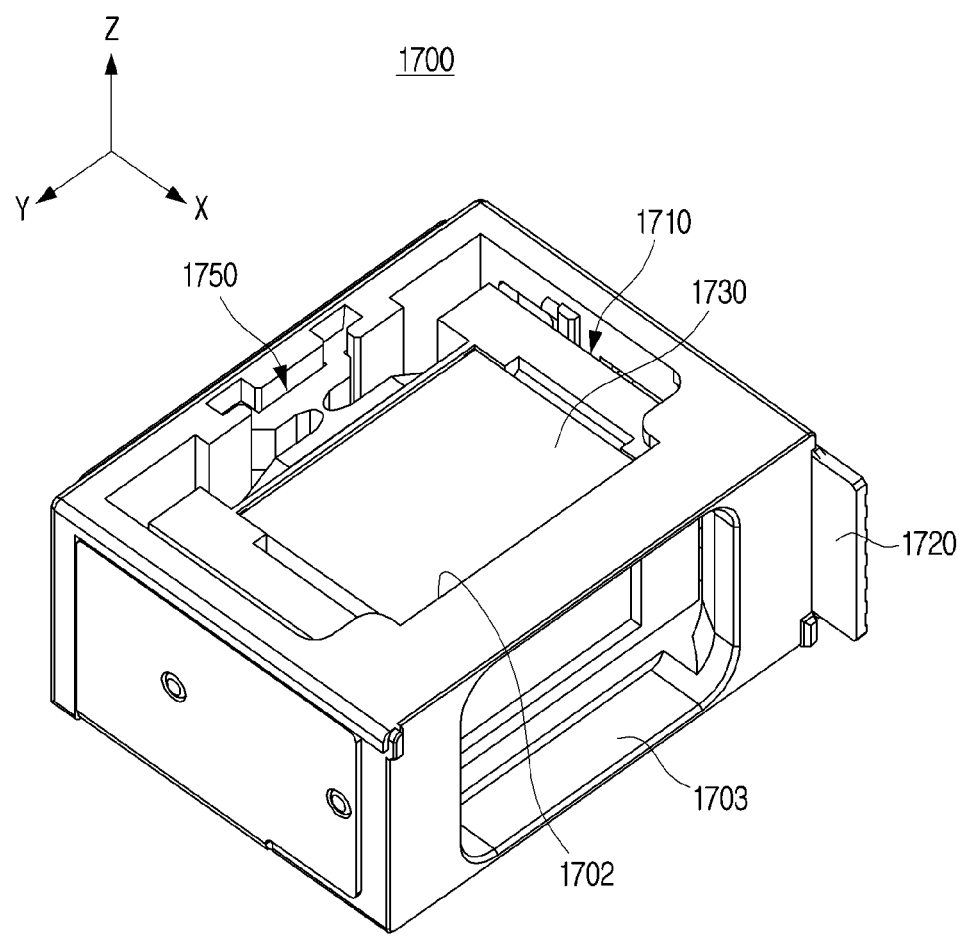
FIG. 15 is an assembled perspective view illustrating another example of an optical path changing unit.
Figure 16:
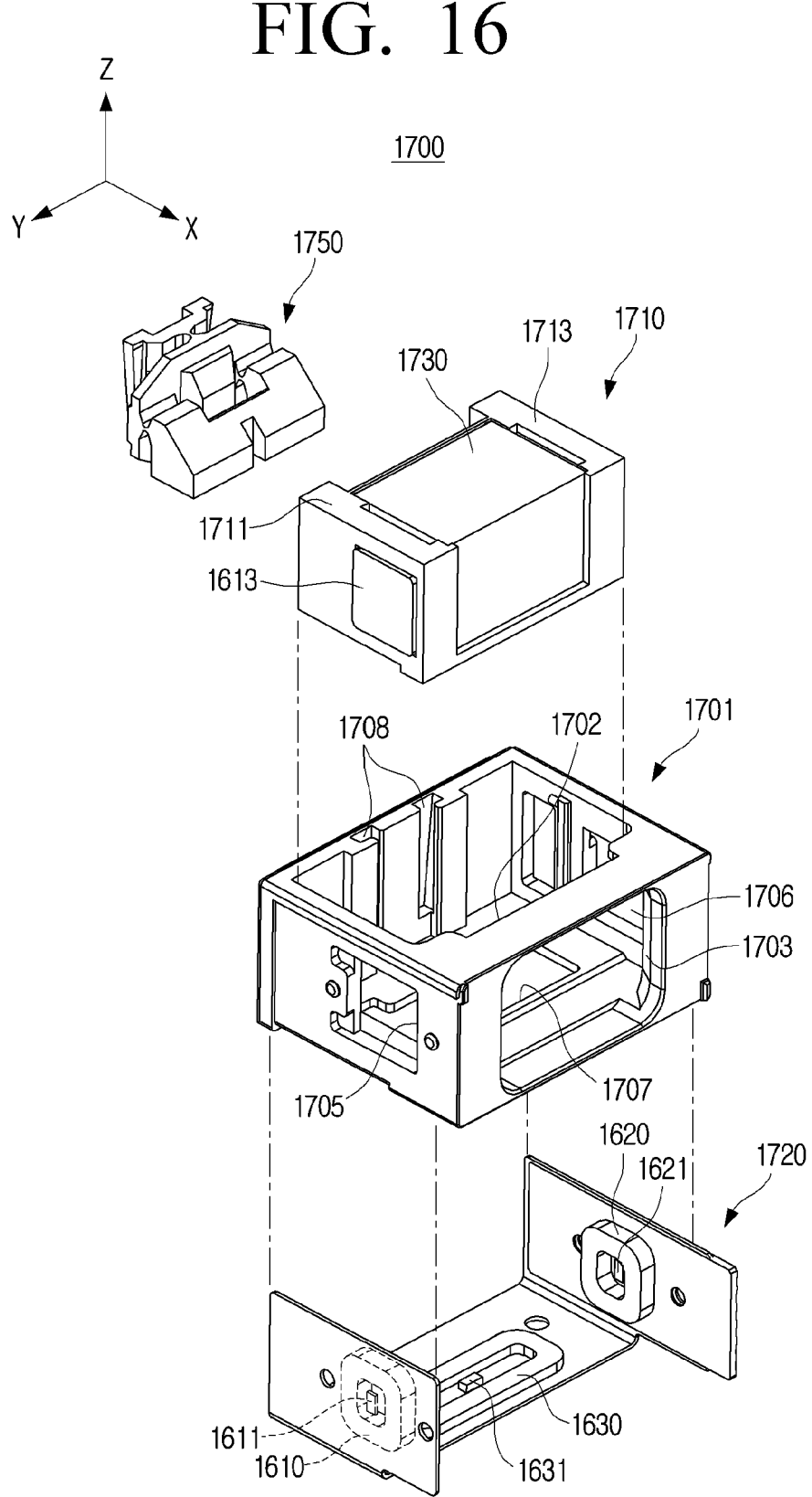
FIG. 16 is an exploded perspective view illustrating the optical path changing unit shown in FIG. 15.

FIG. 15 is an assembled perspective view illustrating another example of an optical path changing unit; FIG. 16 is an exploded perspective view illustrating the optical path changing unit shown in FIG. 15.

Referring to FIGS. 15 and 16, the optical path changing unit 1700 may be disposed within a separate housing 1701. Accordingly, the optical path changing unit 1700 may be disposed outside the base 300 described above.

The housing 1701 is formed of an approximately rectangular parallelepiped shape, the first light through hole 1702 is formed for light incidence on an upper surface and the second light through hole 1703 is formed on the front surface.

The first light through hole 1702 may be used as a hold for light incidence and for inserting or withdrawing the frame support 1710 inside the housing 1701.

The housing 1701 includes a first insertion hole 1705 and a second insertion hole 1706 into which a third coil 1610 and a fourth coil 1620, which are part of a second OIS drive unit, are inserted into a left side and a right side, respectively. The housing 1701 has a third insertion hole 1707 into which the fifth coil 1630, which is a part of the second OIS drive unit, is inserted into the lower surface of the housing 1701.

The printed circuit substrate 1720 is coupled to the housing 1701 to respectively surround the left and right sides and a lower side. The printed circuit board 1720 may be made of FPCB so that transformation would be easy.

The housing 1701 has a coupling groove 110 in which a coupling portion 1752 (see FIG. 17) of the hinge member 1750 is detachably coupled to a rear surface of the housing 1701.

Figure 17:
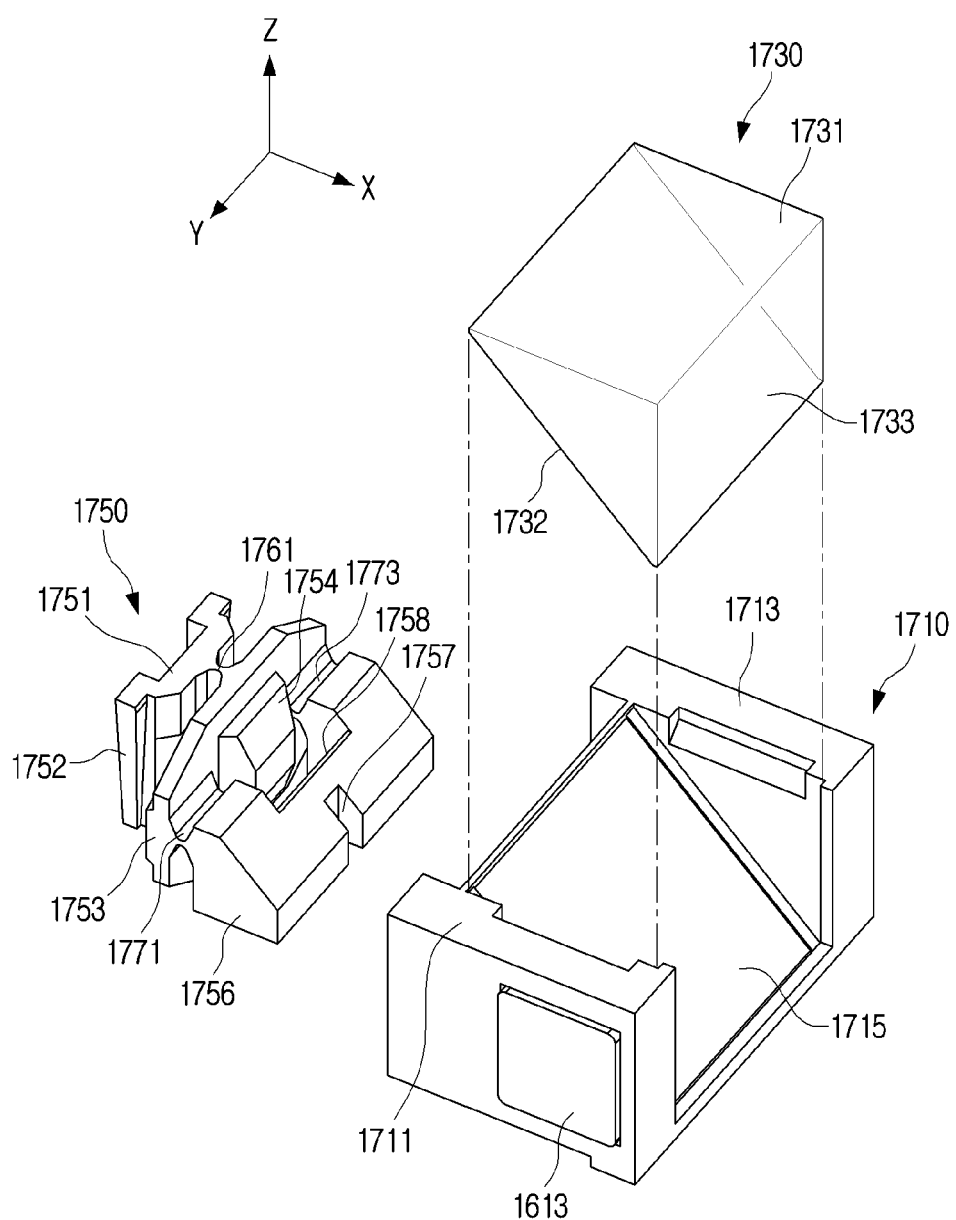
FIG. 17 is an exploded perspective view illustrating the prism, the prism support, and the hinge member shown in FIG. 16.
Figure 18:
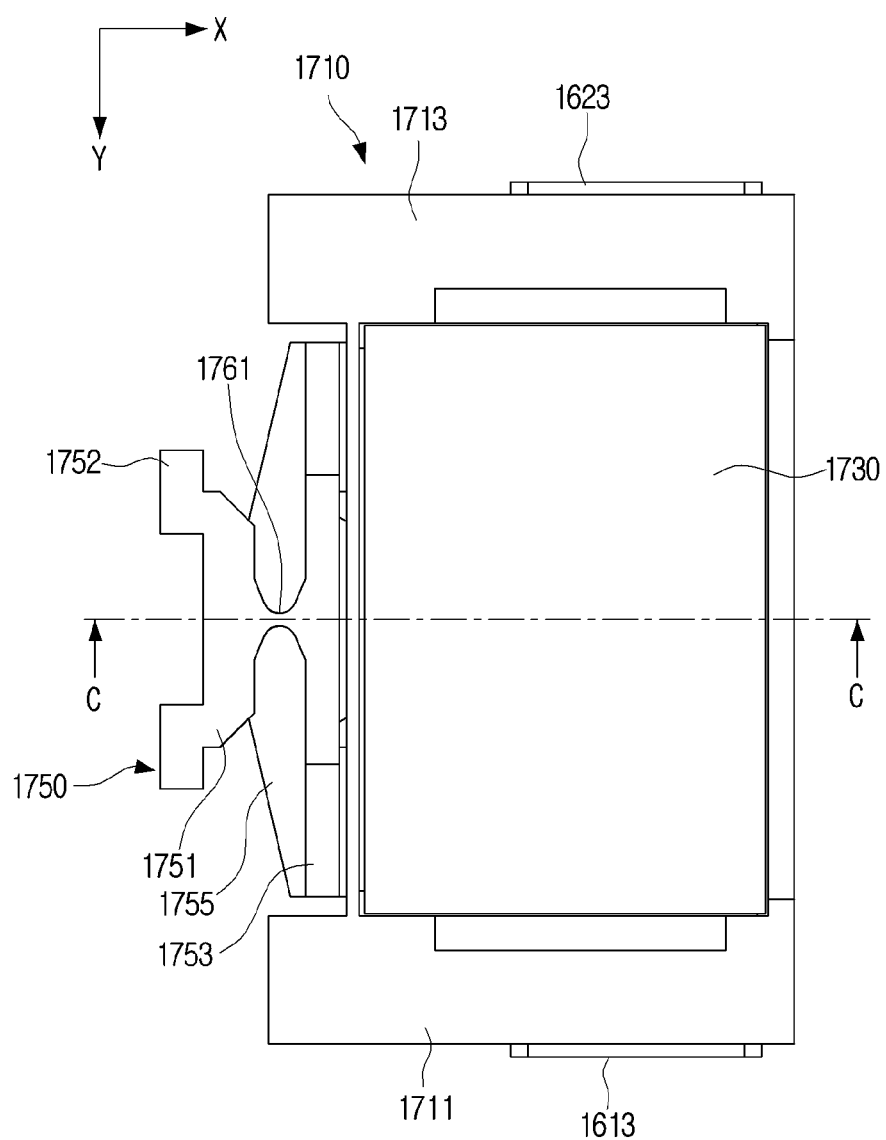
FIG. 18 is an assembled plan view illustrating the prism, the prism support, and the hinge member shown in FIG. 17.
Figure 19:
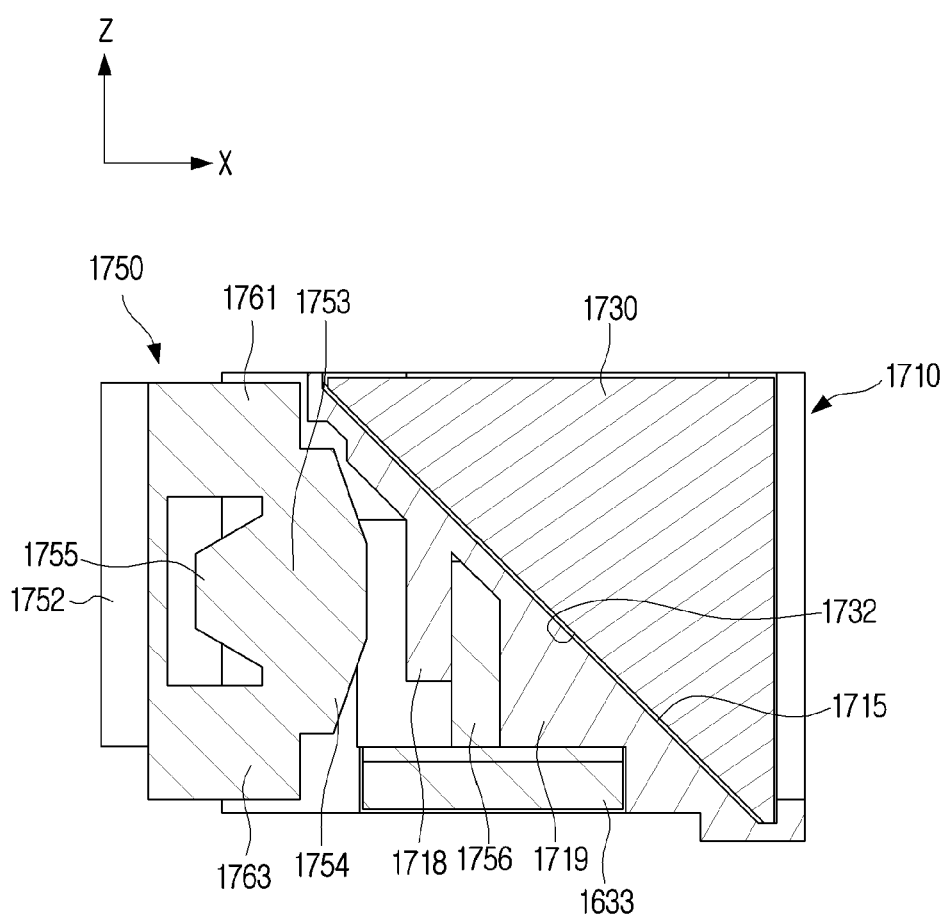
FIG. 19 is a cross-sectional view taken along line C-C shown in FIG. 18.
Figure 20:
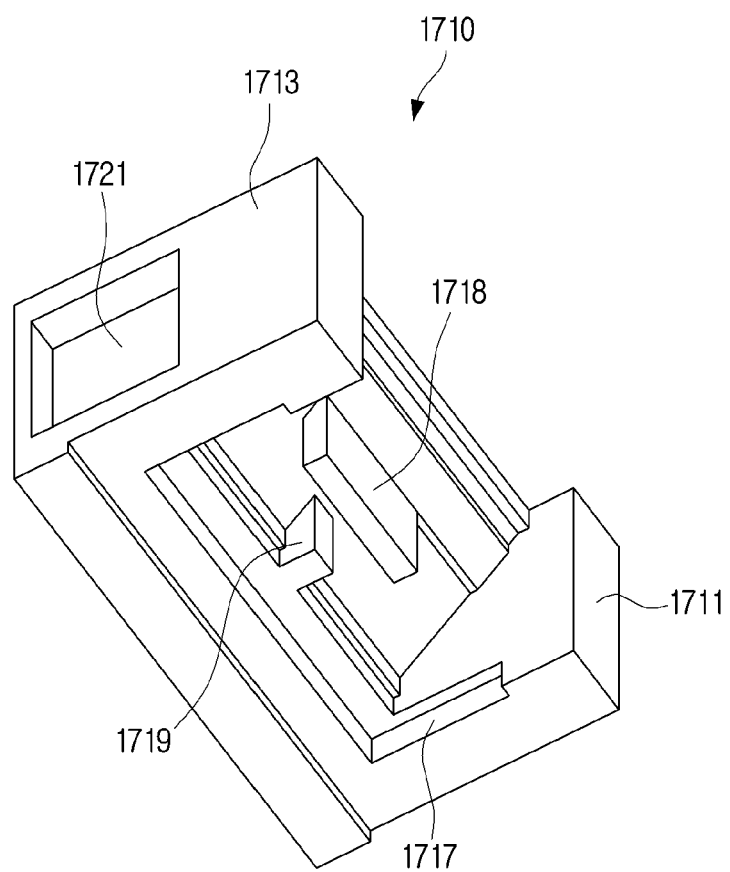
FIG. 20 is a perspective view illustrating a lower portion of the prism support shown in FIG. 17.
Figure 21:
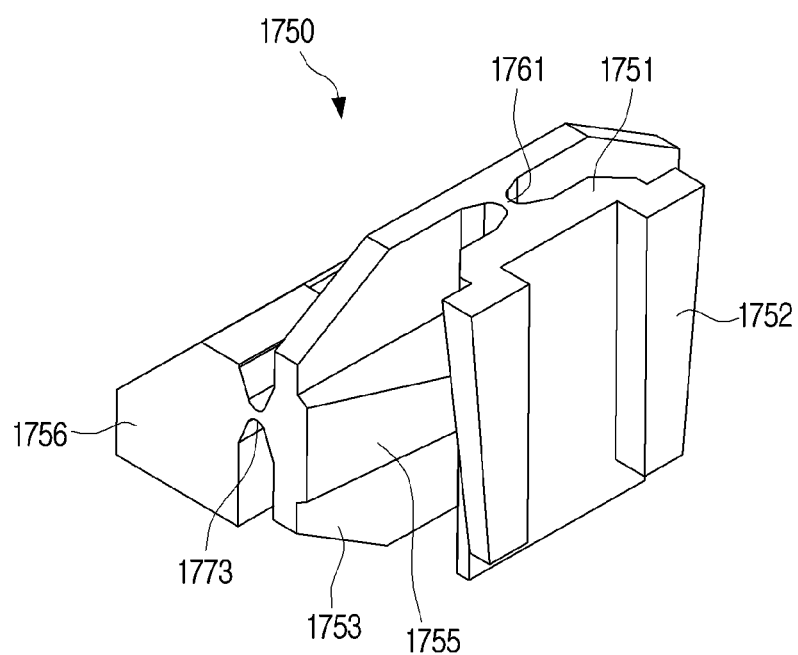
FIG. 21 is a perspective view illustrating a rear portion of the hinge member of FIG. 17.

FIG. 17 is an exploded perspective view illustrating the prism, the prism support, and the hinge member shown in FIG. 16; FIG. 18 is an assembled plan view illustrating the prism, the prism support, and the hinge member shown in FIG. 17; FIG. 19 is a cross-sectional view taken along line C-C shown in FIG. 18; FIG. 20 is a perspective view illustrating a lower portion of the prism support shown in FIG. 17; and FIG. 21 is a perspective view illustrating a rear portion of the hinge member of FIG. 17.

Referring to FIGS. 17 to 21, a prism 1730 is fixed to a fixing portion formed in front of the prism support 1710. The fixing portion may be formed in a concave shape by the left block 1711, the right block 1713, and the inclined surface 1715 to correspond to the shape of the prism 1730.

The outer surface of the left block 1711 is provided with a coupling groove 1721 into which the third magnet 1613, which is a part of the first OIS drive unit, is inserted. After the yoke (not shown) is first inserted into the coupling groove 1721, the third magnet 1613 is inserted.

The third magnet 1613 may be disposed to face the third coil 1610, and may form a first OIS drive unit together with the third coil 1610. The third coil 1610 may have a closed curve shape, and a hall sensor 1611 (see FIG. 16) may be disposed inside the closed curve. The tilting angle of the prism support 1710 may be controlled by sensing the degree of tilting of the third magnet 1613 through the hall sensor 1611.

The outer surface of the right block 1713 is provided with a coupling groove (not shown) into which the fourth magnet 1623, which is a part of the first OIS drive unit, is inserted. After the yoke (not shown) is first inserted into the coupling groove, the fourth magnet 1623 is inserted.

The fourth magnet 1623 may be disposed to face the fourth coil 1620, and may form a first OIS drive unit together with the fourth coil 1620. The fourth coil 1620 may have a closed curve shape, and a hall sensor 1621 (see FIG. 16) may be disposed inside the closed curve. The tilting angle of the prism support 1710 may be controlled by sensing the degree of tilting of the fourth magnet 1623 through the hall sensor 1621.

The fifth magnet 1633 may be coupled to a fixing groove 1717 under the prism support 1710 to face the fifth coil 1630. The fifth magnet 1633 forms a second OIS drive unit together with the fifth coil 1630. The fifth coil 1630 may have a closed curve shape, and a hall sensor 1631 (see FIG. 16) may be disposed inside the closed curve. The tilting angle of the prism support 1710 may be controlled by sensing the degree of tilting of the fifth magnet 1633 through the hall sensor 1631.

The prism 1730 may change the optical path to enable OIS control so that the light incident from the outside of the mobile device is reflected toward the lens unit 500 (see FIG. 1) while being tilted together with the prism support 1710.

The prism 1730 may be inserted into and fixed to a fixing portion of the prism support 1710. In this case, an adhesive may be applied to the inner surfaces of the left block 1711 and the right block 1713 of the prism support 1710 to be attached to the left block 1711 of the prism support 1710 and the inner surface of the right block 1713 of the prism 1730, respectively.

Referring to FIGS. 17, 19, and 21, the hinge member 1750 supports the prism support 1710 such that the prism support 1710 is tilted about the Z-axis by the operation of the first OIS drive unit and tilts around the Y-axis by operation of the second OIS drive unit. The hinge member 1750 may be formed by injection molding using a synthetic resin. In this case, the synthetic resin may be made of a material having a predetermined elasticity.

The hinge member 1750 may include first to third portions 1751, 1753, and 1756, a pair of first hinges 1761 and 1763 connecting the first and second portions 1751 and 1753, and a pair of second hinges 1771 and 1773 connecting the second portion 1753 and the third portion 1756.

The first portion 1751 is coupled to a slot 1708 (see FIG. 16) formed in a rear portion of the housing 1701 through a coupling portion 1752 formed in a wedge shape. In this case, the shape of the slot 1708 may have a wedge shape to correspond to the coupling portion 1752.

The pair of first hinges 1761 and 1763 are disposed between the first portion 1751 and the second portion 1753 and interconnect the first portion 1751 and the second portion 1753. The pair of first hinges 1761 and 1763 may be located on the Z-axis, and may be the central axis of the left and right tilting operations of the prism support 1710 according to the operation of the first OIS drive unit.

The pair of first hinges 1761 and 1763 are arranged at predetermined intervals up and down, and one end of the pair of first hinges 1761 and 1763 is integrally connected to the front surface of the first portion 1751 and the other end thereof is integrally connected to the rear surface of the second portion 1753.

The pair of first hinges 1761 and 1763 may be gradually thinner from both ends to the center. This considers that the pair of first hinges 1761 and 1763 may be smoothly tilted with respect to the Z axis according to the operation of the first OIS drive unit. In addition, the left and right tilting angles of the prism support 1710 may be adjusted by appropriately adjusting the thickness of the central portion of the pair of first hinges 1761 and 1763.

The second portion 1753 may include a first reinforcing protrusion 1754 protruding forward and a second reinforcing protrusion 1755 protruding rearward.

The first and second reinforcing protrusions 1754 and 1755 increase the rigidity of the second portion 1753, thereby preventing the second portion 1753 from being bent or twisted due to the weight of the prism support 1710 and the prism 1730, thereby enabling accurate OIS control.

The pair of second hinges 1771 and 1773 is disposed between the second portion 1753 and the third portion 1756 and interconnects the second portion 1753 and the third portion 1756. The pair of second hinges 1771 and 1773 may be located on the Y-axis, and may be the central axis of the vertical tilting operation of the prism support 1710 according to the operation of the second OIS drive unit.

The pair of second hinges 1771 and 1773 are disposed at predetermined intervals in left and right directions, respectively, one end of each of the second hinges 1771 and 1773 is integrally connected to the front surface of the second portion 1753, and the other end thereof is integrally connected to the rear surface of the third portion 1756.

Like the pair of first hinges 1761 and 1763, the pair of second hinges 1771 and 1773 may be gradually thinner from both ends toward the center. This considers that the pair of second hinges 1771 and 1773 may be tilted smoothly with respect to the Y axis according to the operation of the second OIS drive unit. Further, the rigidity and flexibility of the pair of second hinges 1771 and 1773 may be appropriately adjusted by appropriately adjusting the thickness of the middle portion of the pair of second hinges 1771 and 1773.

The third portion 1756 may be formed in the first coupling groove 1757 into which the first coupling protrusion 1719 (see FIG. 20) of the prism support 1710 is inserted in front, and may be formed in the second coupling groove 1758 into which the first coupling protrusion 1718 (see FIG. 20) of the prism support 1710 is inserted.

Through the coupling structure as described above, the third portion 1756 may be firmly fixed to the rear of the prism support 1710. In addition, bonding between the third portion 1756 and the prism support 1710 may be performed together by applying an adhesive between the third portion 1756 and the prism support 1710 together with the coupling structure.

Figure 22:
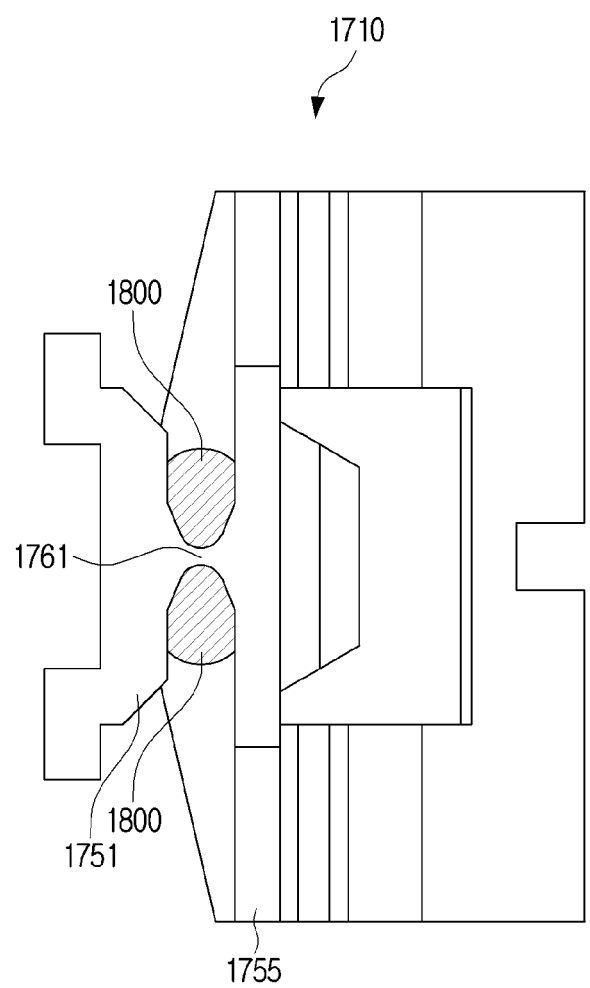
FIG. 22 is a plan view illustrating an example in which a damping bond is filled in a concave portion of both sides of a pair of first hinges of a hinge member.
Figure 23:
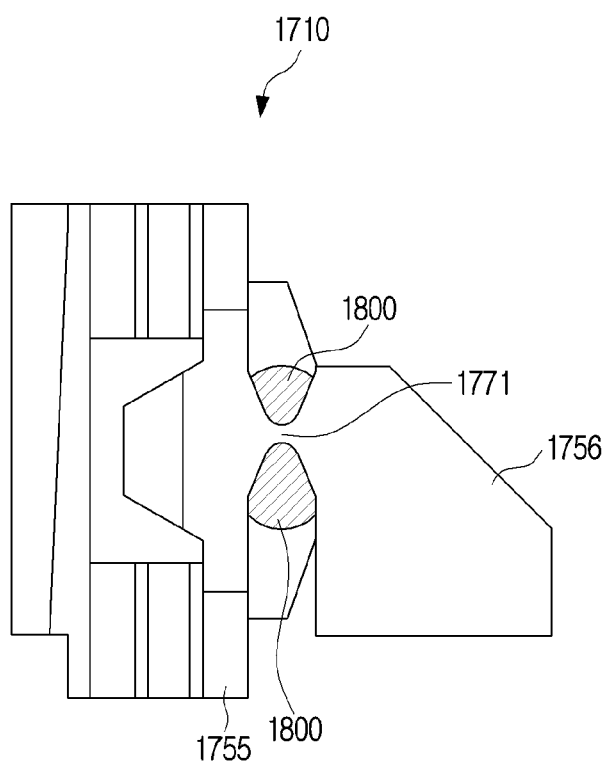
FIG. 23 is a plan view illustrating an example in which a damping bond is filled in both sides of both sides of a pair of second hinges of the hinge member.

FIG. 22 is a plan view illustrating an example in which a damping bond is filled in a concave portion of both sides of a pair of first hinges of a hinge member; FIG. 23 is a plan view illustrating an example in which a damping bond is filled in both sides of both sides of a pair of second hinges of the hinge member.

Referring to FIG. 22, the damping bond 1800 may be applied between the first portion 1751 and the second portion 1755.

The thickness of each of the first hinges 1761 and 1763 gradually decreases toward the center. Accordingly, a concave portion may be formed at both sides of each of the first hinges 1761 and 1763. Each factor may be filled with a certain amount of damping bond 1800. The damping bond 1800 may have a predetermined elasticity in a semi-solid state without being completely cured after being filled in the recess. The damping bond 1800 may elastically support the first hinges 1761 and 1763 together. As described above, the damping bond 1800 may cancel the possibility of oscillation that may occur during the OIS control process, and may absorb vibration according to an external impact. The damping bond 1800 is preferably maintained in a gel state even if curing is completed after application to serve as a damper, and is not fully cured.

Referring to FIG. 23, the damping bond 1800 may be applied between the second portion 1755 and the second portion 1756.

The thickness of the second hinges 1771 and 1773 gradually decreases toward the center of the second hinges 1771 and 1773. Accordingly, a concave portion may be formed at both sides of each of the second hinges 1771 and 1773. Each recess may be filled with a certain amount of damping bond 1800. The damping bond 1800 may have a predetermined elasticity in a semi-solid state without being completely cured after being filled in the recess. The damping bond 1800 may elastically support each of the second hinges 1771 and 1773.

In the case of the hinge member 710 shown in FIG. 12, the pair of first hinges 761 and 763 and the pair of second hinges 771 and 773 may be elastically supported by the damping bond 1800, similar to the pair of first hinges 1761 and 1763 and the pair of second hinges 1771 and 1773 of the hinge member 1710 shown in FIGS. 22 and 23.

Figure 24:
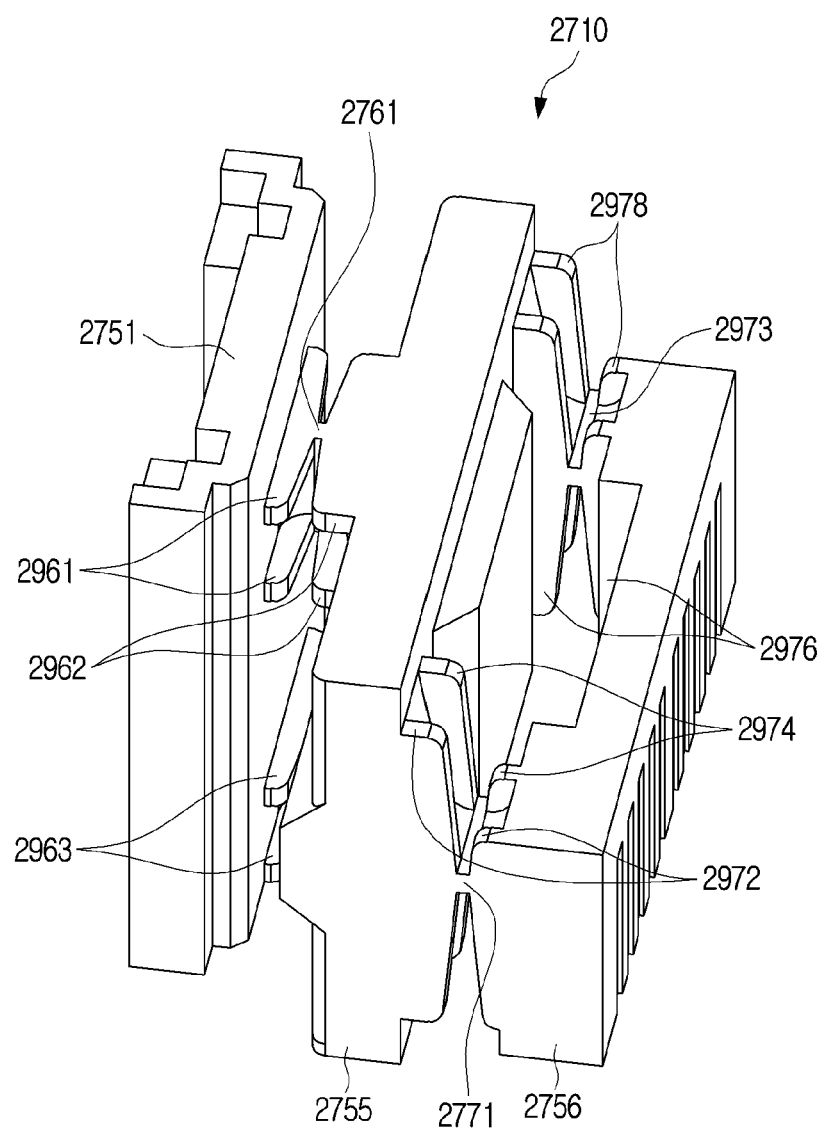
FIG. 24 is a perspective view illustrating a hinge member in which a plurality of ribs for preventing scattering of the damping bond are formed.

FIG. 24 is a perspective view illustrating a hinge member in which a plurality of ribs for preventing scattering of the damping bond are formed. For convenience, in FIG. 24, a damping bond elastically supports a pair of first hinges and a pair of second hinges will not be illustrated.

Referring to FIG. 24, a damping bond may be applied between the first portion 2751 and the second portion 2755. The position where the damping bond is applied may be applied in a receiving groove provided at both sides of the pair of first hinges 2761. Here, the first hinge positioned below the pair of first hinges is not shown.

A pair of ribs 2961 and 2962 formed symmetrically in the horizontal direction are formed at the upper end and the lower end of the first hinge 2761 formed on the upper side among the pair of first hinges. In this example, the above-described receiving grooves may be provided at both sides of the first hinge 2761 by the pair of ribs 2961 and 2962.

A damping bond (not shown) may be applied in the receiving groove. The damping bond applied in the receiving groove may effectively prevent scattering due to an external impact.

In addition, a pair of ribs 2963 symmetrically formed in the horizontal direction may be formed at the upper end and the lower end of the first hinge formed on the lower side among the pair of first hinges, and a receiving groove in which the damping bond is accommodated may be provided by the pair of ribs.

A damping bond may also be applied between the second portion 2755 and the third portion 2756. The position to which the damping bond is applied may be applied in a receiving groove provided at both sides of the pair of second hinges 2771 and 2773.

Referring to FIG. 24, a pair of ribs 2972 and 2974 that are symmetrically formed in a vertical direction are formed at the left end and the right end of the second hinge 2771 formed on the left side among the pair of second hinges 2771 and 2773. In this example, the above-described receiving grooves may be provided at both sides of the second hinge 2771 by the pair of ribs 2972 and 2974.

A damping bond (not shown) may be applied in the receiving groove. The damping bond applied in the receiving groove may effectively prevent scattering due to an external impact.

A pair of ribs 2976 and 2978 formed in the horizontal direction may be formed on the left end and the right end of the second hinge 2973 formed at the lower side among the pair of second hinges, and a receiving groove in which the damping bond is accommodated may be provided by the pair of ribs.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

INDUSTRIAL APPLICABILITY

The disclosure relates to a miniature lens assembly applied to a mobile device.

What is claimed is:
1. A lens assembly comprising:
   a base;
   a lens unit which is disposed on one side inside the base and is configured to move forward or rearward in a length-wise direction of the base;

an optical path changing unit disposed in an inner other side of the base, of which a portion is coupled to the base and other portion is movably disposed in the base;

an auto focusing (AF) drive unit configured to move the lens unit forward or rearward; and first and second optical image stabilizing (OIS) drive units configured to move the optical path changing unit in a tiltable posture; wherein the optical path changing unit comprises:
a prism support;
a prism coupled to a fixing portion formed in front of the prism support; and
a hinge member tiltably supporting the prism support with respect to a first axis and a second axis orthogonal with each other;

the hinge member comprises:
a first portion including a coupling portion coupled to a slit formed on a rear side wall of the base;
a second portion connected to the first portion through a pair of first hinges; and
a third portion connected to a second portion through a pair of second hinges and coupled to a rear portion of the prism support;

the first portion comprises a first reinforcing protrusion protrudingly formed in a front direction and configured to add rigidity;

the pair of first hinges comprise one end being integrally connected to the first reinforcing protrusion and other end being integrally connected to a rear surface of the second portion;

the second portion comprises a second reinforcing protrusion protruding in a front direction and configured to add rigidity and a second protrusion protrudingly formed in a rear direction;

the pair of first hinges are each formed such that outer circumferential surfaces on left and right sides thereof are rounded toward the inside between the first reinforcing protrusion and the second portion; and the pair of second hinges are each formed such that outer circumferential surfaces on upper and lower sides thereof are rounded toward the inside between the second portion and the third portion.

2. The lens assembly of claim 1, wherein the fixing portion is formed of a concave groove shape by a left side wall, a right side wall, and a rear side wall of the prism support, and wherein the prism has both side surfaces being bonding-coupled to the left side wall and the right side wall of the fixing portion.

3. The lens assembly of claim 2, wherein a plurality of bonding insertion grooves for inserting an adhesive are formed in the left side wall and the right side wall of the fixing portion.

4. The lens assembly of claim 1, wherein the coupling portion of the first portion is made of a wedge shape, and
wherein the slit is formed of a shape corresponding to the coupling portion.

5. The lens assembly of claim 1, wherein thickness of the pair of first hinges is gradually thinner from both ends toward a center, and
wherein thickness of the pair of second hinges is gradually thinner from both ends toward a center.

6. The lens assembly of claim 1, wherein the hinge member is formed by injection molding with a synthetic resin having elasticity.

7. The lens assembly of claim 1, wherein the first OIS drive unit is configured to tilt the prism support with respect to the pair of first hinges, and
wherein the second OIS drive unit is configured to tilt the prism support with respect to the pair of second hinges.

8. The lens assembly of claim 7, wherein the first OIS drive unit comprises:
a third coil located at a left side of the base;
a third magnet coupled with a left side of the prism support to face the third coil;
a fourth coil located at a right side of the base; and
a fourth magnet coupled at a right side of the prism support to face the fourth coil.

9. The lens assembly of claim 1, wherein a plurality of balls are disposed between a bottom of the base and the lens unit, and
wherein the plurality of balls slidably support the lens unit with respect to the base.

10. The lens assembly of claim 9, wherein the base comprises a yoke member embedded in an inside of a bottom of a portion where the lens unit is disposed to be orthogonal with respect to a length-direction, and
wherein the yoke member comprises:
a first yoke corresponding to a first magnet of the AF drive unit disposed on one side of the lens unit; and
a second yoke corresponding to a second magnet of the AF drive unit disposed on other side of the lens unit.

11. The lens assembly of claim 1, wherein a damping bond is applied on between the first portion and the second portion and between the second portion and the third portion.

12. The lens assembly of claim 1, wherein a damping bond is applied on both sides of the pair of first hinges, and
wherein a damping bond is applied on both sides of the pair of second hinges.

13. The lens assembly of claim 12, wherein a receiving groove for receiving the damping bond is provided by first ribs formed around the pair of first hinges respectively, and
wherein a receiving groove for receiving the damping bond is provided by second ribs around the pair of second hinges, respectively.

* * * * *